(12) United States Patent
Liu et al.

(10) Patent No.: US 10,477,520 B2
(45) Date of Patent: Nov. 12, 2019

(54) FEEDBACK RESOURCE ALLOCATION FOR MULTIPLE CARRIERS

(71) Applicant: QUALCOMM Incorporated, San Diego, CA (US)

(72) Inventors: Ruoheng Liu, San Diego, CA (US); Jun Ma, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 15/164,765

(22) Filed: May 25, 2016

(65) Prior Publication Data

US 2017/0265177 A1    Sep. 14, 2017

Related U.S. Application Data

(60) Provisional application No. 62/308,187, filed on Mar. 14, 2016.

(51) Int. Cl.
*H04W 72/04* (2009.01)
*H04L 1/18* (2006.01)
(Continued)

(52) U.S. Cl.
CPC ........ *H04W 72/0406* (2013.01); *H04B 7/185* (2013.01); *H04L 1/1854* (2013.01);
(Continued)

(58) Field of Classification Search
None
See application file for complete search history.

(56) References Cited

U.S. PATENT DOCUMENTS 6,947,445 B1 * 9/2005 Barnhart ............ H04B 7/18584
                                                    370/232
9,246,656 B2    1/2016 Kim et al.
(Continued)

FOREIGN PATENT DOCUMENTS

EP         2858290 A1    4/2015
WO    WO-2013067426 A1   5/2013

OTHER PUBLICATIONS

International Search Report and Written Opinion—PCT/US2017/022193—ISA/EPO—dated Jun. 22, 2017.

*Primary Examiner* — Phirin Sam
*Assistant Examiner* — Faiyazkhan Ghafoerkhan
(74) *Attorney, Agent, or Firm* — Loza & Loza LLP

(57) ABSTRACT

Various aspects of the disclosure relate to allocating control signaling resources for multiple carrier scenarios. In an example implementation, N-to-1 mapping is used between forward link control signaling resource allocation indices (e.g., control channel elements) and return link control signaling resources (e.g., for ACK/NACK signaling) indices in each return link component carrier. A collision between forward link control signaling assignments for different user terminals (UTs) may occur when UT-specific search spaces overlap each other. Such a collision may be avoided, for example, by scheduling different UTs on different return link component carriers, scheduling return link grants instead of forward link grants, or scheduling a different forward link control signaling candidate that is associated with a different forward link control signaling resource allocation index.

30 Claims, 25 Drawing Sheets

(51) Int. Cl.
*H04W 72/14* (2009.01)
*H04W 74/08* (2009.01)
*H04L 5/00* (2006.01)
*H04B 7/185* (2006.01)
*H04W 84/06* (2009.01)
*H04W 88/16* (2009.01)

(52) U.S. Cl.
CPC .......... *H04L 1/1861* (2013.01); *H04L 5/0055* (2013.01); *H04W 72/14* (2013.01); *H04W 74/085* (2013.01); *H04L 5/001* (2013.01); *H04W 84/06* (2013.01); *H04W 88/16* (2013.01)

(56) References Cited

U.S. PATENT DOCUMENTS

| | | | | |
|---|---|---|---|---|
| 2011/0243066 | A1* | 10/2011 | Nayeb Nazar | H04L 1/007 370/328 |
| 2011/0261679 | A1* | 10/2011 | Li | H04L 1/1812 370/216 |
| 2011/0268032 | A1* | 11/2011 | Kim | H04L 1/1671 370/328 |
| 2012/0057449 | A1* | 3/2012 | Takaoka | H04B 1/713 370/210 |
| 2013/0188592 | A1* | 7/2013 | Yang | H04L 5/00 370/329 |
| 2014/0079008 | A1* | 3/2014 | Park | H04L 1/1896 370/329 |
| 2014/0177580 | A1* | 6/2014 | Takaoka | H04B 1/713 370/329 |
| 2014/0301290 | A1 | 10/2014 | He et al. | |
| 2015/0023264 | A1 | 1/2015 | Tiirola et al. | |
| 2015/0043480 | A1 | 2/2015 | Lee et al. | |
| 2015/0055618 | A1* | 2/2015 | Takaoka | H04B 1/713 370/330 |
| 2015/0098370 | A1* | 4/2015 | Lee | H04L 1/1671 370/280 |
| 2015/0208403 | A1 | 7/2015 | Takeda et al. | |
| 2017/0013612 | A1* | 1/2017 | Nayeb Nazar | H04L 1/007 |
| 2017/0245262 | A1* | 8/2017 | Nayeb Nazar | H04L 1/007 |
| 2017/0265177 | A1* | 9/2017 | Liu | H04W 72/0406 |
| 2018/0302896 | A1* | 10/2018 | Nayeb Nazar | H04L 1/007 |
| 2019/0165894 | A1* | 5/2019 | Choi | H04L 1/1854 |
| 2019/0222288 | A1* | 7/2019 | Zhou | H04W 72/04 |

\* cited by examiner

FEEDBACK RESOURCE ALLOCATION FOR MULTIPLE CARRIERS

CROSS-REFERENCE TO RELATED APPLICATION(S)

This application claims priority to and the benefit of provisional patent application No. 62/308,187 filed in the U.S. Patent and Trademark Office on Mar. 14, 2016, the entire content of which is incorporated herein by reference.

INTRODUCTION

Various aspects described herein relate to wireless communication and, more particularly but not exclusively, to resource allocation for scenarios that involve multiple carriers.

Some communication systems employ a hybrid automatic repeat request (HARQ) scheme to improve communication reliability. For example, uplink (UL) resources may be allocated to communicate HARQ feedback associated with downlink (DL) data transmissions.

Some communication systems may employ a single carrier in one direction and multiple carriers in the reverse direction. For example, a network device may serve multiple user devices via a DL carrier, but it might be difficult to make the UL bandwidth contiguous given the dynamic nature of the user devices or other factors. Thus, multiple carriers may be used for the UL where each UL carrier has a bandwidth that is narrower than the DL bandwidth. Here, different devices (e.g., UEs) may be associated with different ones of the UL carriers. As a particular example, a satellite-based communication system may include one or more satellites to relay communication signals between a Satellite Network Portal (SNP) and one or more user terminals (UTs). An SNP is an earth station having an antenna for providing communication links, via the satellites, for connecting a UT (e.g., that includes a UE) to other UTs or users of other communication systems. A satellite may transmit forward service link (e.g., DL) signals to multiple UTs via one carrier and receive return service link (e.g., UL) signals from each of the UTs via a corresponding carrier.

In communication systems that employ an asymmetric carrier scheme, there may be a one-to-one mapping between DL control resource allocations used for DL assignments and UL control resource allocations used for UL control signaling (e.g., ACK, NACK, or discontinuous transmission (DTX) feedback) in each UL carrier. In this case, UL control resources may be allocated in each carrier, but only a fraction of these resource might actually be used in each UL transmission time interval. For example, if there are 6 UL carriers and 1 DL carrier, only ⅙ of reserved UL resources might be used in each UL transmission time interval. Thus, the UL control overhead may be unnecessarily high.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: determine at least one resource for communicating return link control information, wherein the determination is based on a quantity of control channel indices allocated for forward link control signaling and a quantity of return link carriers; and communicate the return link control information via the determined at least one resource.

Another aspect of the disclosure provides a method for communication including: determining at least one resource for communicating return link control information, wherein the determination is based on a quantity of control channel indices allocated for forward link control signaling and a quantity of return link carriers; and communicating the return link control information via the determined at least one resource.

Another aspect of the disclosure provides an apparatus configured for communication. The apparatus including: means for determining at least one resource for communicating return link control information, wherein the determination is based on a quantity of control channel indices allocated for forward link control signaling and a quantity of return link carriers; and means for communicating the return link control information via the determined at least one resource.

Another aspect of the disclosure provides a non-transitory computer-readable medium storing computer-executable code, including code to: determine at least one resource for communicating return link control information, wherein the determination is based on a quantity of control channel indices allocated for forward link control signaling and a quantity of return link carriers; and communicate the return link control information via the determined at least one resource.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
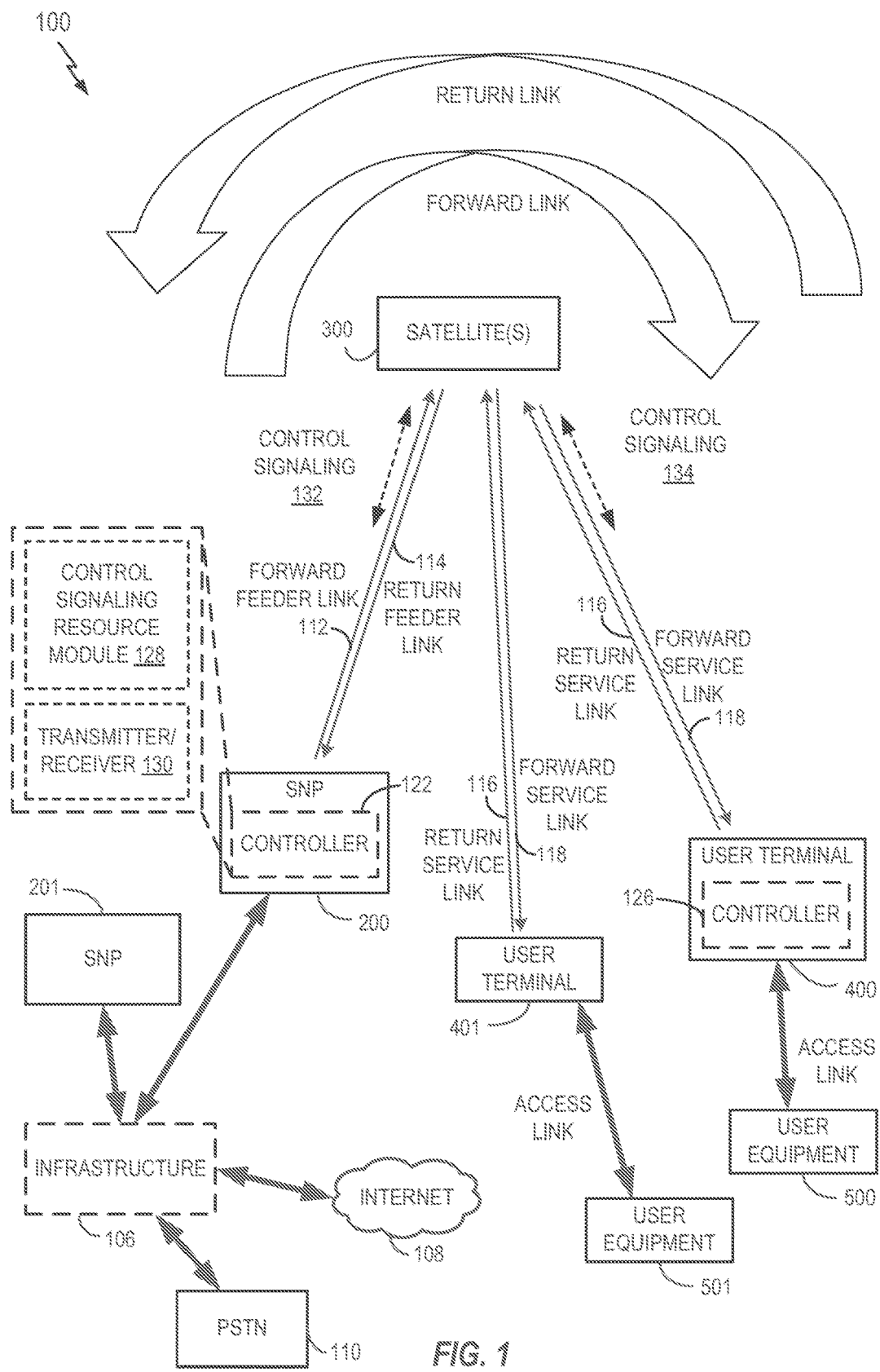
FIG. 1 is a block diagram of an example communication system in accordance with some aspects of the disclosure.

The disclosure relates in some aspects to allocating control signaling resources for multiple carrier scenarios. In an example implementation, N-to-1 mapping is used between forward link (or downlink) control signaling resource allocation indices (e.g., control channel elements, CCEs) and return link (or uplink) control signaling resource indices in each return link component carrier. The return link control signaling may include, for example, acknowledgement signaling including positive acknowledgements (ACKs) and negative acknowledgements (NACKs). A collision between forward link control signaling assignments for different user terminals (UTs) may occur when UT-specific search spaces overlap each other or if overlap is indicated by a modulo operation as described in Equation 3 below. Such a collision may be avoided, for example, by scheduling different UTs on different return link component carriers, scheduling return link grants instead of forward link grants, or scheduling a different downlink control signaling candidate that is associated with a different forward link control signaling resource allocation index.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

Some satellite-based communication systems include gateways and one or more satellites to relay communication signals between the gateways and one or more user terminals (UTs). A gateway is an earth station having an antenna for transmitting signals to, and receiving signals from, communication satellites. A gateway provides communication links, using satellites, for connecting a UT to other UTs or users of other communication systems, such as a public switched telephone network, the Internet and various public and/or private networks. A satellite is an orbiting receiver and repeater used to relay information.

A satellite can receive signals from and transmit signals to a UT provided the UT is within the "footprint" of the satellite. The footprint of a satellite is the geographic region on the surface of the earth within the range of signals of the satellite. The footprint is usually geographically divided into "beams," through the use of antennas (e.g., the antennas may be used to create fixed, static beams or may be used to create dynamically adjustable beams through beam-forming techniques). Each beam covers a particular geographic region within the footprint. Beams may be directed so that more than one beam from the same satellite covers the same specific geographic region. In addition, beams from multiple satellites may be directed to cover the same geographic region.

Geosynchronous satellites have long been used for communication. A geosynchronous satellite is stationary relative to a given location on the earth. However, because geosynchronous satellites are limited to a geosynchronous orbit (GSO), which is a circle having a radius of approximately 42,164 km from the center of the earth directly above the earth's equator, the number of satellites that may be placed in the GSO is limited.

As alternatives to geosynchronous satellites, communication systems which utilize a constellation of satellites in non-geosynchronous orbits, such as low-earth orbits (LEO), have been devised to provide communication coverage to the entire earth or at least large parts of the earth. In non-geosynchronous satellite-based systems, such as LEO satellite-based systems, the satellites move relative to a communication device (such as a gateway or a UT) on the ground.

FIG. 1 illustrates an example of a satellite communication system 100 which includes a plurality of satellites (although only one satellite 300 is shown for clarity of illustration) in non-geosynchronous orbits, for example, low-earth orbits (LEO), a satellite network portal (SNP) 200 (e.g., corresponding to a satellite gateway) in communication with the satellite 300, a plurality of UTs 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or the UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and a return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or the UT 401. Alternatively, a UT and a corresponding UE may be integral parts of a single physical device, such as a mobile telephone with an integral satellite transceiver and an antenna for communicating directly with a satellite, for example.

The SNP 200 may have access to the Internet 108 or one or more other types of public, semiprivate or private networks. In the example illustrated in FIG. 1, the SNP 200 is in communication with infrastructure 106, which is capable of accessing the Internet 108 or one or more other types of public, semiprivate or private networks. The SNP 200 may also be coupled to various types of communication backhaul, including, for example, landline networks such as optical fiber networks or public switched telephone networks (PSTN) 110. Further, in alternative implementations the SNP 200 may interface to the Internet 108, PSTN 110, or one or more other types of public, semiprivate or private networks without using the infrastructure 106. Still further, the SNP 200 may communicate with other SNPs, such as the SNP 201 through the infrastructure 106 or alternatively may be configured to communicate to the SNP 201 without using the infrastructure 106. The infrastructure 106 may include, in whole or part, a network control center (NCC), a satellite control center (SCC), a wired and/or wireless core network and/or any other components or systems used to facilitate operation of and/or communication with the satellite communication system 100.

Communication between the satellite 300 and the SNP 200 in both directions are called feeder links, whereas communication between the satellite and each of the UTs 400 and 401 in both directions are called service links. A signal path from the satellite 300 to a ground station, which may be the SNP 200 or one of the UTs 400 and 401, may be generically called a downlink. A signal path from a ground station to the satellite 300 may be generically called an uplink. Additionally, as illustrated, signals can have a general directionality such as a forward link and a return link (or reverse link). Accordingly, a communication link in a direction originating from the SNP 200 and terminating at the UT 400 through the satellite 300 is called a forward link, whereas a communication link in a direction originating from the UT 400 and terminating at the SNP 200 through the satellite 300 is called a return link or a reverse link. As such, the signal path from the SNP 200 to the satellite 300 is labeled a "Forward Feeder Link" 112 whereas the signal path from the satellite 300 to the SNP 200 is labeled a "Return Feeder Link" 114 in FIG. 1. In a similar manner, the signal path from each UT 400 or 401 to the satellite 300 is labeled a "Return Service Link" 116 whereas the signal path from the satellite 300 to each UT 400 or 401 is labeled a "Forward Service Link" 118 in FIG. 1.

In accordance with the teachings herein, the satellite communication system 100 supports a resource allocation scheme for return link control information transmission. This resource allocation scheme reduces return link control overhead and avoids collision of HARQ feedback from different UTs. In some implementations, the SNP 200 includes a controller 122 that supports this resource allocation scheme. In some implementations, the UT 400 includes a controller 126 that supports this resource allocation scheme. Other components of the satellite communication system 100 may include corresponding controllers as well. For example, other SNPs, satellites, and UTs (not shown) may include a corresponding controller.

As shown in FIG. 1, the controller 122 includes a control signaling resource module 128 and a transmitter/receiver 130. The control signaling resource module 128 schedules forward link messages, each of which conveys the control information about the forward link data be transmitted for a particular UT. These scheduled forward link messages use non-overlapped resources in terms of control channel elements (CCEs), each of which is labeled with an index (e.g., a CCE index). The transmitter/receiver 130 sends and receives control signaling 132 on the links from and to the SNP 200, respectively.

The controller 126 also may include a control signaling resource module and a transmitter/receiver. These modules are only illustrated for the controller 122, however, to reduce the complexity of FIG. 1. For the controller 126, the transmitter/receiver sends and receives control signaling 134 on the links from and to the UT 400, respectively, and the control signaling resource module determines the resources to be used for return link control signaling as discussed herein.

Figure 2:
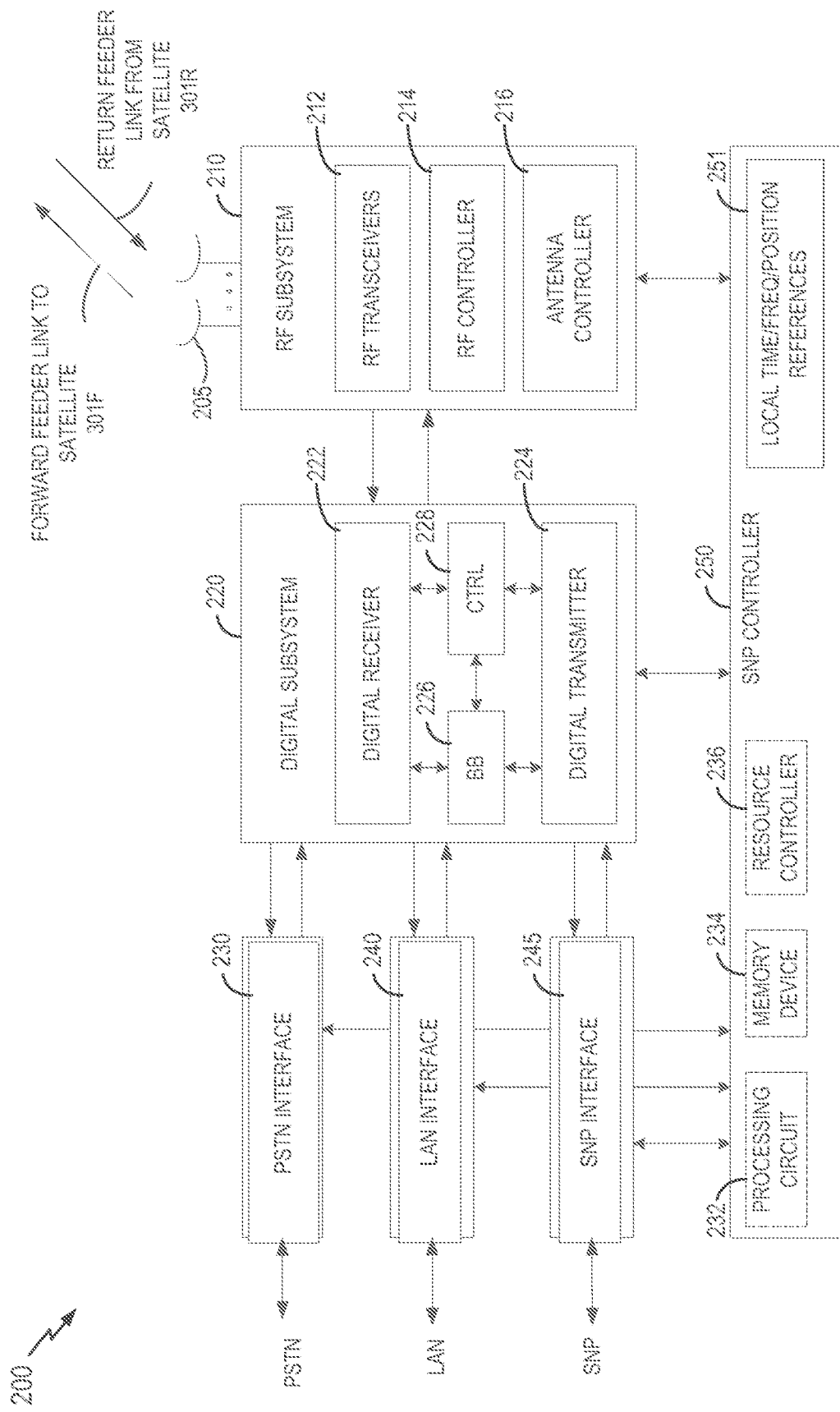
FIG. 2 is a block diagram of one example of a satellite network portal (SNP) of FIG. 1 in accordance with some aspects of the disclosure.

FIG. 2 is an example block diagram of the SNP 200, which also can apply to the SNP 201 of FIG. 1. The SNP 200 is shown to include a number of antennas 205, an RF subsystem 210, a digital subsystem 220, a Public Switched Telephone Network (PSTN) interface 230, a Local Area Network (LAN) interface 240, an SNP interface 245, and an SNP controller 250. The RF subsystem 210 is coupled to the antennas 205 and to the digital subsystem 220. The digital subsystem 220 is coupled to the PSTN interface 230, to the LAN interface 240, and to the SNP interface 245. The SNP controller 250 is coupled to the RF subsystem 210, the digital subsystem 220, the PSTN interface 230, the LAN interface 240, and the SNP interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of a number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communication between the SNP 200 and the UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to the digital receiver modules 222, the digital transmitter modules 224, and the baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the SNP 200 to a ground-based network (e.g., the Internet).

The LAN interface 240 may provide communication signals to, and receive communication signals from, an external LAN. For example, the LAN interface 240 may be coupled to the Internet 108 either directly or through additional infrastructure 106, as illustrated in FIG. 1. The LAN interface 240 is well known in the art, and therefore is not described in detail herein.

The SNP interface 245 may provide communication signals to, and receive communication signals from, one or more other SNPs associated with the satellite communication system 100 of FIG. 1 (and/or to/from SNPs associated with other satellite communication systems, not shown for simplicity). For some implementations, the SNP interface 245 may communicate with other SNPs via one or more dedicated communication lines or channels (not shown for simplicity). For other implementations, the SNP interface 245 may communicate with other SNPs using the PSTN 110 and/or other networks such as the Internet 108 (see also FIG. 1). For at least one implementation, the SNP interface 245 may communicate with other SNPs via the infrastructure 106.

Overall SNP control may be provided by the SNP controller 250. The SNP controller 250 may plan and control utilization of the satellite 300's resources by the SNP 200. For example, the SNP controller 250 may analyze trends, generate traffic plans, allocate satellite resources, monitor (or track) satellite positions, and monitor the performance of the SNP 200 and/or the satellite 300. The SNP controller 250 may also be coupled to a ground-based satellite controller (not shown for simplicity) that maintains and monitors orbits of the satellite 300, relays satellite usage information to the SNP 200, tracks the positions of the satellite 300, and/or adjusts various channel settings of the satellite 300.

For the example implementation illustrated in FIG. 2, the SNP controller 250 includes local time, frequency, and position references 251, which may provide local time or frequency information to the RF subsystem 210, the digital subsystem 220, and/or the interfaces 230, 240, and 245. The time or frequency information may be used to synchronize the various components of the SNP 200 with each other and/or with the satellite(s) 300. The local time, frequency, and position references 251 may also provide position information (e.g., ephemeris data) of the satellite(s) 300 to the various components of the SNP 200. Further, although depicted in FIG. 2 as included within the SNP controller 250, for other implementations, the local time, frequency, and the position references 251 may be a separate subsystem that is coupled to the SNP controller 250 (and/or to one or more of the digital subsystem 220 and the RF subsystem 210).

Although not shown in FIG. 2 for simplicity, the SNP controller 250 may also be coupled to a network control center (NCC) and/or a satellite control center (SCC). For example, the SNP controller 250 may allow the SCC to communicate directly with the satellite(s) 300, for example, to retrieve ephemeris data from the satellite(s) 300. The SNP controller 250 may also receive processed information (e.g., from the SCC and/or the NCC) that allows the SNP controller 250 to properly aim its antennas 205 (e.g., at the appropriate satellite(s) 300), to schedule beam transmissions, to coordinate handoffs, and to perform various other well-known functions.

The SNP controller 250 may include one or more of a processing circuit 232, a memory device 234, or a resource controller 236 that independently or cooperatively perform resource allocation-related operations for the SNP 200 as taught herein. In an example implementation, the processing circuit 232 is configured (e.g., programmed) to perform some or all of these operations. In another example implementation, the processing circuit 232 (e.g., in the form of a processor) executes code stored in the memory device 234 to perform some or all of these operations. In another example implementation, the resource controller 236 is configured (e.g., programmed) to perform some or all of these operations. Although depicted in FIG. 2 as included within the SNP controller 250, for other implementations, one or more of the processing circuit 232, the memory device 234, or the resource controller 236 may be a separate subsystem that is coupled to the SNP controller 250 (and/or to one or more of the digital subsystem 220 and the RF subsystem 210).

Figure 3:
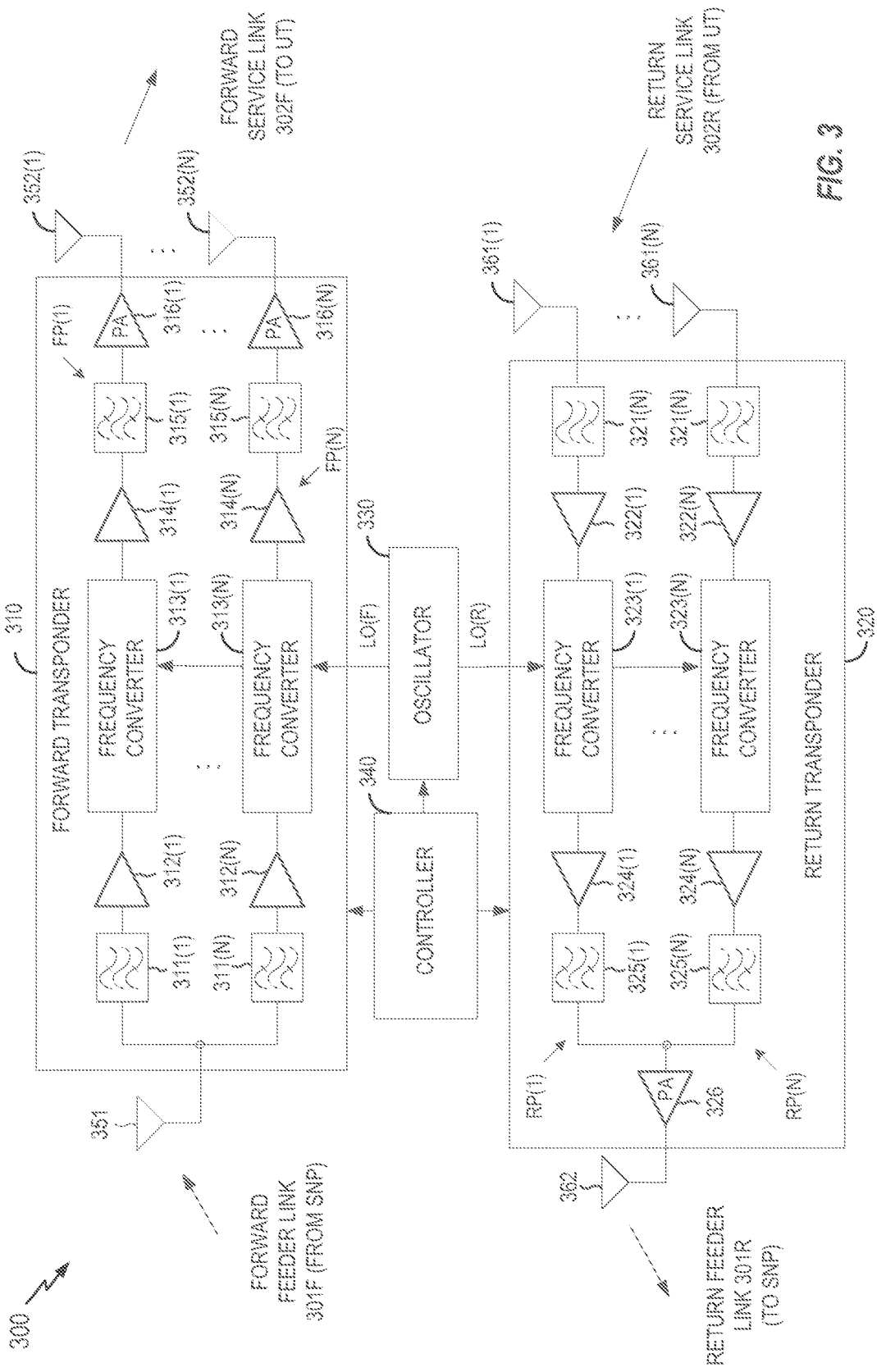
FIG. 3 is a block diagram of one example of a satellite of FIG. 1 in accordance with some aspects of the disclosure.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the SNP 200 and the UT 400. It will be appreciated that the disclosure is not limited to any specific satellite configuration and any satellite or combinations of satellites that can provide the functional connection between the SNP 200 and UT 400 can be considered within the scope of the disclosure. In one example, the satellite 300 is shown to include a forward transponder 310, a return transponder 320, an oscillator 330, a controller 340, forward link antennas 351 and 352(1)-352(N), and return link antennas 362 and 361(1)-361(N). The forward transponder 310, which may process communication signals within a corresponding channel or frequency band, may include a respective one of first bandpass filters 311(1)-311(N), a respective one of first low noise amplifiers (LNAs) 312(1)-312(N), a respective one of frequency converters 313(1)-313(N), a respective one of second LNAs 314(1)-314(N), a respective one of second bandpass filters 315(1)-315(N), and a respective one of power amplifiers (PAs) 316(1)-316(N). Each of the PAs 316(1)-316(N) is coupled to a respective one of antennas 352(1)-352(N), as shown in FIG. 3.

Within each of respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from the satellite 300 to the UT 400). The second LNA 314 amplifies the frequency-converted communication signals, and the second bandpass filter 315 filters signal components having frequencies outside of the associated channel width. The PA 316 amplifies the filtered signals to a power level suitable for transmission to the UTs 400 via a respective antenna 352. The return transponder 320, which includes a number N of return paths RP(1)-RP(N), receives communication signals from the UT 400 along the return service link 302R via the antennas 361(1)-361(N), and transmits communication signals to the SNP 200 along the return feeder link 301R via one or more of the antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from the satellite 300 to the SNP 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the SNP 200.

The oscillator 330, which may be any suitable circuit or device that generates an oscillating signal, provides a forward local oscillator signal LO(F) to the frequency converters 313(1)-313(N) of the forward transponder 310, and provides a return local oscillator signal LO(R) to the frequency converters 323(1)-323(N) of the return transponder 320. For example, the LO(F) signal may be used by the frequency converters 313(1)-313(N) to convert communication signals from a frequency band associated with the transmission of signals from the SNP 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the SNP 200.

The controller 340, which is coupled to the forward transponder 310, the return transponder 320, and the oscillator 330, may control various operations of the satellite 300 including (but not limited to) channel allocations. In one aspect, the controller 340 may include a processing circuit 364 (e.g., a processor) coupled to a memory (e.g., a memory device 366). The memory may include a non-transitory computer-readable medium (e.g., one or more nonvolatile memory elements, such as an EPROM, an EEPROM, a Flash memory, a hard drive, etc.) storing instructions that, when executed by the processing circuit 364, cause the satellite 300 to perform operations including (but not limited to) those described herein.

Figure 4:
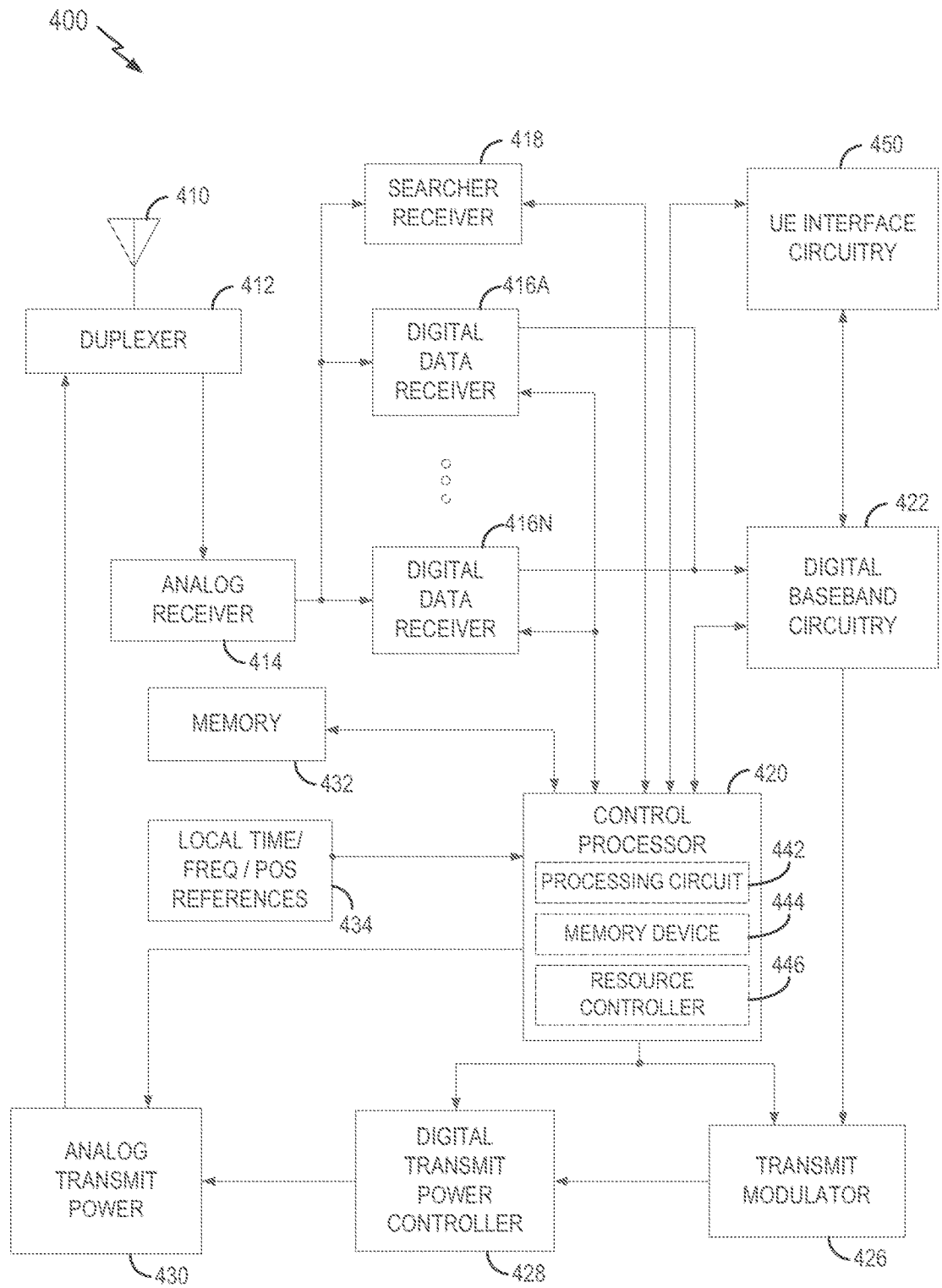
FIG. 4 is a block diagram of one example of a UT of FIG. 1 in accordance with some aspects of the disclosure.

An example of a transceiver for use in the UT 400 or the UT 401 is illustrated in FIG. 4. In FIG. 4, at least one antenna 410 is provided for receiving forward link communication signals (e.g., from the satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers (e.g., as represented by a digital data receiver 416N) can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 includes processing and presentation elements used to transfer information to and from the UE 500 as shown in FIG. 1, for example. Referring to FIG. 4, if diversity signal processing is employed, the digital baseband circuitry 422 may include a diversity combiner and decoder (not shown). Some of these elements may also operate under the control of, or in communication with, a control processor 420.

When voice or other data is prepared as an output message or a communication signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., the satellite 300).

In FIG. 4, the UT transceiver also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element (e.g., the memory 432) as desired.

The control processor 420 may also be coupled to the UE interface circuitry 450 to allow communication between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

The control processor 420 may include one or more of a processing circuit 442, a memory device 444, or a resource controller 446 that independently or cooperatively perform resource allocation-related operations for the UT 400 as taught herein. In an example implementation, the processing circuit 442 is configured (e.g., programmed) to perform some or all of these operations. In another example implementation, the processing circuit 442 (e.g., in the form of a processor) executes code stored in the memory device 444 to perform some or all of these operations. In another example implementation, the resource controller 446 is configured (e.g., programmed) to perform some or all of these operations. Although depicted in FIG. 4 as included within the control processor 420, for other implementations, one or more of the processing circuit 442, the memory device 444, or the resource controller 446 may be a separate subsystem that is coupled to the control processor 420.

Figure 5:
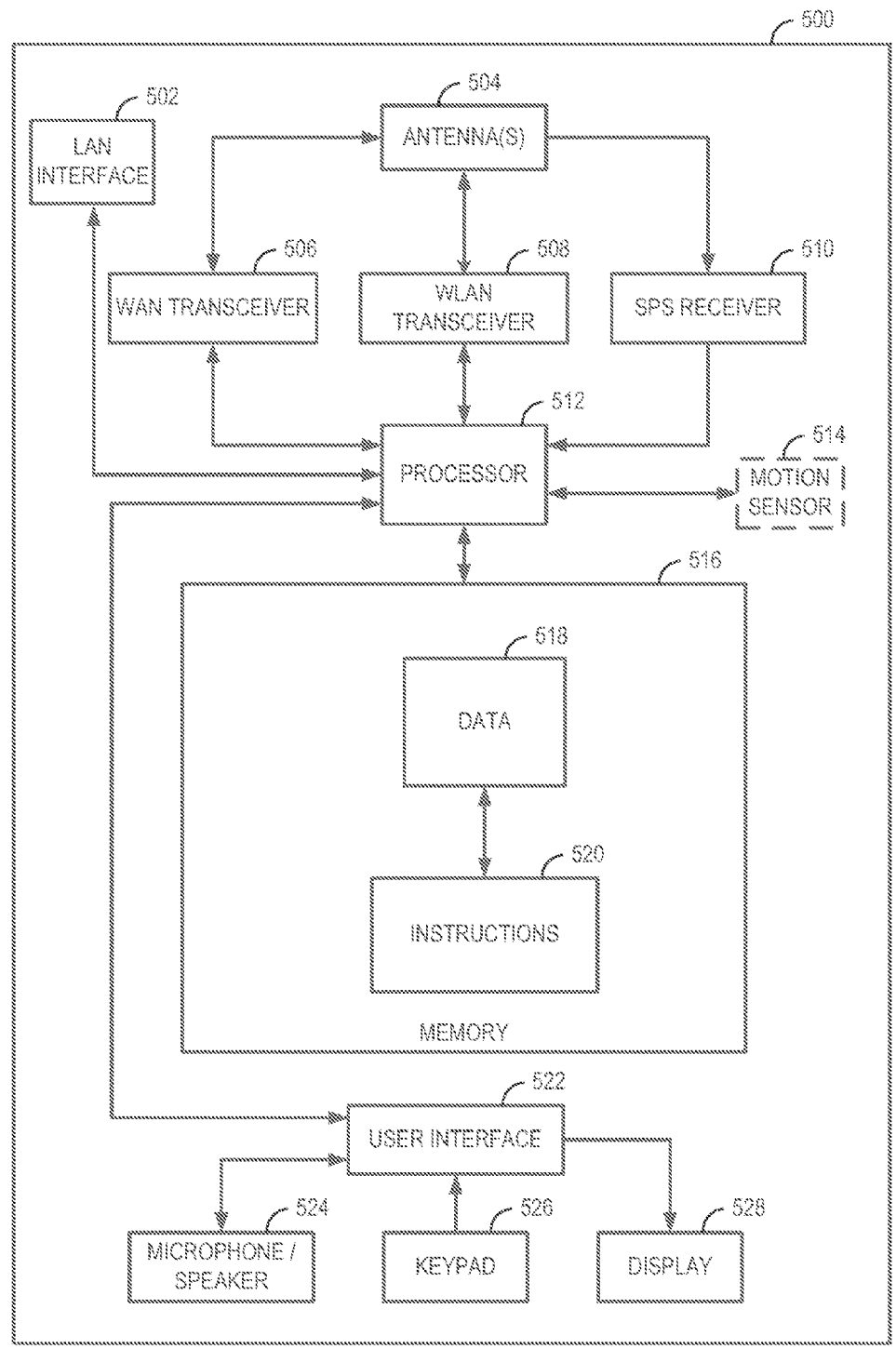
FIG. 5 is a block diagram of one example of a user equipment of FIG. 1 in accordance with some aspects of the disclosure.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may include a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth, ZigBee and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

In the example shown in FIG. 1, the two UTs 400 and 401 may conduct two-way communication with the satellite 300 via return and forward service links within a beam coverage. A satellite may communicate with more than two UTs within a beam coverage. The return service link from the UTs 400 and 401 to the satellite 300 may thus be a many-to-one channel. Some of the UTs may be mobile while others may be stationary, for example. In a satellite communication system such as the example illustrated in FIG. 1, multiple UTs 400 and 401 within a beam coverage may be time-division-multiplexed (TDM'ed), frequency-division-multiplexed (FDM'ed), or both.

At some point in time, a UT may need to be handed-off to another satellite (not shown in FIG. 1). Handoff may be caused by scheduled events or unscheduled events.

Several examples of handoff due to scheduled events follow. Inter-beam and inter-satellite handoff may be caused by movement of the satellite, movement of the UT, or a satellite beam being turned off (e.g., due to a Geo-stationary satellite (GEO) restriction). Handoff also may be due to a satellite moving out of the SNP's range while the satellite is still within the UT's line of sight.

Several examples of handoff due to nonscheduled events follow. Handoff may be triggered by a satellite being obscured by an obstacle (e.g., a tree). Handoff also may be triggered due to a drop in channel quality (e.g., signal quality) due to rain fade or other atmospheric conditions.

In some implementations, at a particular point in time, a particular satellite may be controlled by a particular entity (e.g., a network access controller, NAC) in an SNP. Thus, an SNP may have several NACs (e.g., implemented by the SNP controller 250 of FIG. 2), each of which controls a corresponding one of the satellites controlled by the SNP. In addition, a given satellite may support multiple beams. Thus, over time, different types of handoff may occur.

In inter-beam handoff, a UT is handed-off from one beam of a satellite to another beam of the satellite. For example, the particular beam serving a stationary UT may change over time as the serving satellite moves.

In inter-satellite handoff, a UT is handed-off from the current serving satellite (referred to as the source satellite) to another satellite (referred to as the target satellite). For example, a UT may be handed-off to the target satellite as the source satellite moves away from the UT and the target satellite moves toward the UT.

Asymmetric Carrier Aggregation

Figure 6:
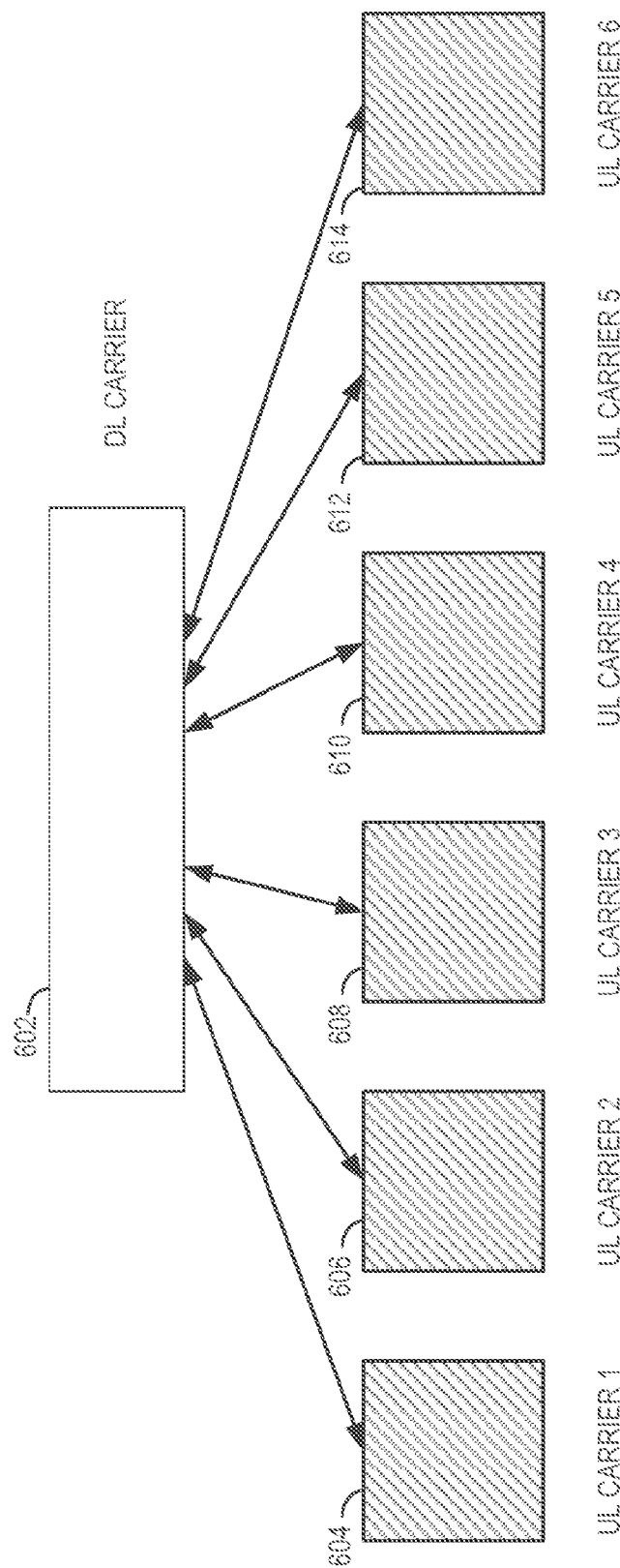
FIG. 6 is a diagram of an example DL/UL carrier scheme.

Referring to FIG. 6, an example of asymmetric carrier aggregation for a communication system will be described. For purposes of explanation, signaling in this communication system is discussed in the context of a $3^{rd}$ Generation Partnership Project (3GPP) Long Term Evolution (LTE) architecture. It should be appreciated, however, that other communication technologies could be applicable as well.

The communication system employs a single downlink carrier and multiply uplink carriers (e.g., downlink/uplink asymmetric carrier planning), in which different UEs may be associated with different UL carriers. For example, two UEs may use UL carrier 1, three UEs may use UL carrier 2, one UE may use UL carrier 3, and so on. When allocating resources for uplink control signaling transmission, one issue relates to how to manage the uplink resources used for the HARQ feedback associated with downlink data transmission.

In FIG. 6, resources (e.g., resource blocks) allocated for a given component carrier are represented in a simplified manner by a rectangular block where time corresponds to the x-axis and frequency corresponds to the y-axis. Thus, a set of resources 602 are allocated for the DL carrier. In addition, a set of resources is allocated for each UL carrier. For example, the resources 604 are allocated for the UL carrier 1, the resources 606 are allocated for the UL carrier 2, and so on.

In Frequency Division Duplex (FDD) LTE, Physical Uplink Control Channel (PUCCH) formats 1a/1b are used for ACK/NACK feedback. The uplink control resource for PUCCH format 1a/1b is determined by the first Control Channel Element (CCE) index used for the transmission of the corresponding Physical Downlink Control Channel (PD-CCH) assignment (e.g., a downlink grant). Here, the UE may use a control resource index calculated as set forth in Equation 1.

$$n_{PUCCH}^{(1)} = n_{CCE} + N_{PUCCH}^{(1)} \qquad \text{EQUATION 1}$$

In Equation 1, $n_{CCE}$ is the number of the first CCE used for transmission of the corresponding Downlink Control Information (DCI) assignment, and $N_{PUCCH}^{(1)}$ may be configured by higher software layers and represents the lowest resource index used for PUCCH format 1a/1b.

If the downlink control region has K CCEs (e.g., the possible value of $n_{CCE}$ of a downlink grant can be any integer value from 0 to K−1), Equation 1 implies that the system shall reserve K uplink control resource indices in each uplink component carrier, so that there is a one-to-one mapping between downlink PDCCH resource allocations, in terms of CCE, and PUCCH format 1a/1b resource indices in each uplink component carrier.

Figure 7:
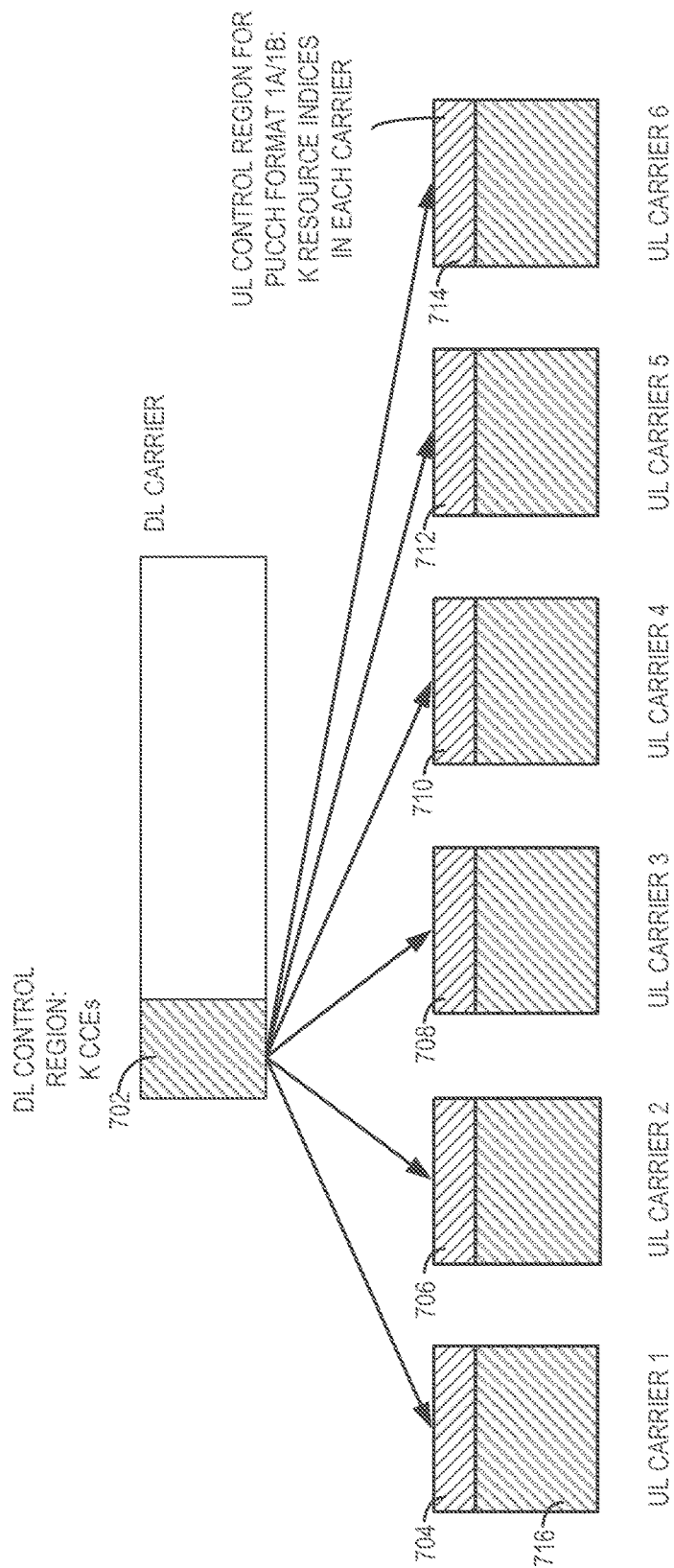
FIG. 7 is a diagram of an example resource allocation for the DL/UL carrier scheme of FIG. 6.

Referring to FIG. 7, a downlink control region 702 for a DL carrier is associated with K CCEs. In this case, the system reserves K resource indices used for PUCCH format 1a/1b in each uplink carrier. For example, K resource indices are used for an uplink control region 704 for the uplink carrier 1, K resource indices are used for an uplink control region 706 for the uplink carrier 2, and so on. Thus, in total, there are 6×K uplink control resource indices for the six uplink carriers of FIG. 7. If, for example, K is 600, the system reserves 600 resource indices for each carrier. For example, LTE allows up to 36 resource indices of PUCCH format 1a/1b to multiplex within a resource block (RB). That is, the reserved 600 resource indices occupy at least 17 RBs. In this case, if the UL bandwidth is 100 RBs, then 17% of the UL carrier bandwidth is used for the ACK/NACK feedback.

The one-to-one mapping relationship between downlink CCEs (i.e., the DL PDCCH resource allocation in terms of CCE) and PUCCH format 1a/1b resource indices in each uplink component carrier may thus lead to excess uplink control overhead in the scenario of asymmetric carrier aggregation with multiple uplink carriers. For example, uplink control resources may be pre-booked in each carrier, but only a fraction of the resources are used in each uplink transmission time interval. As a specific example, if there are 6 uplink carriers and 1 downlink carrier as shown in FIG. 7, then no more than ⅙ of reserved PUCCH format 1a/1b resources are used in each uplink transmission time interval. Moreover, it may be difficult to reuse unused uplink control resources for uplink data transmission. Accordingly, the scenario of FIG. 7 may result in wasted uplink resources.

Feedback Resource Allocation

The disclosure relates in some aspects to resource allocation for return link (or UL) control signaling (e.g., HARQ feedback) associated with forward link (or DL) data transmission. In some aspects, the resource allocation employs N-to-one mapping between forward link indices (e.g., downlink CCEs) and resource indices in each return link component carrier (e.g., each UL carrier).

For purposes of explanation, the resource allocation will be described in the context of an SNP that communicates with a UT via at least one satellite. This communication is carried over forward and return links as discussed herein.

Thus, in various aspects, the disclosed resource allocation may impact UT behavior and/or SNP behavior. It should be appreciated, however, that the teachings herein may be applicable to other types of communication systems (e.g., that employ UEs, base stations, eNodeBs, uplink communication, downlink communication, PDCCH resources, PUCCH format 1a/1b resources, or other components or forms of communication).

In some aspects, a UT may use the control resource index $n_{RCCH}^{(1)}$ set forth in Equation 2.

$$n_{RCCH}^{(1)} = (n_{CCE}) \bmod \left\lceil A \times \frac{K}{L_{CC}} \right\rceil + N_{RCCH}^{(1)} \qquad \text{EQUATION 2}$$

In Equation 2, $n_{CCE}$ is the number of the first CCE used for transmission of a corresponding forward link control information (FCI) assignment, $N_{RCCH}^{(1)}$ is configured by higher layers, K is the total number of CCEs in a forward link control channel (FCCH) region of the corresponding FCI assignment sub-frame, $L_{CC}$ is the number of return link component carriers available in the system, and A is a parameter configured through upper layer signaling. In some implementations, the range of A is: $1 \le A \le L_{CC}$.

A CCE collision between forward link control information assignments for different UTs may occur when UT-specific search spaces overlap each other or overlap after the modulo operation as described in Equation 3. That is, the indices used to indicate locations in a frequency band will repeat due to the modulo term in Equation 2. Thus, a collision may occur if two UEs on the same component carrier are assigned to the same resource. A scheduler may indicate a potential collision if UT A and UT B are associated with the same return link component carrier and if Equation 3 is met.

$$(n_{CCE,A} - n_{CCE,B}) \bmod \left\lceil A \times \frac{K}{L_{CC}} \right\rceil = 0 \qquad \text{EQUATION 3}$$

In Equation 3, $n_{CCE,A}$ is the first CCE index potentially used for transmission of a forward link grant for UT A and $n_{CCE,B}$ is the first CCE index potentially used for transmission of a forward link grant for UT B. As an example, if A=1, K=600, and $L_{CC}$=6, then $$\left\lceil A \times \frac{K}{L_{CC}} \right\rceil = 100$$

and a collision is indicated if $n_{CCE,A} - n_{CCE,B}$ is a multiple of 100. If Equation 3 is met, Equation 2 implies that UT A and UT B may use the same control resource index $n_{RCCH}^{(1)}$ and leads to a potential collision of return link control resources. The scheduler may avoid this kind of collision using one of the three techniques that follow.

A first technique involves scheduling UTs associated with different return link component carriers if the first CCE of the corresponding forward link grant satisfies Equation 3.

A second technique involves scheduling return link grants if UTs are associated with the same return link component carrier and the first CCE of the corresponding forward link grant satisfies Equation 3. For example, the scheduler may schedule a return link data transmission instead of a forward link data transmission. That is, if the scheduler detects a potential collision, the scheduler may refrain from sending a forward link grant and instead send a return link grant. In this case, there is no need for return link control feedback (e.g., ACK/NACK) for the return link grant. Hence, there is no return link collision since one UT will transmit control signaling via a return link control region (e.g., the control region 704 in FIG. 7) and the other UT will transmit data via a return link data region (e.g., the data region 716 in FIG. 7).

A third technique involves considering a different forward link control channel candidate (associated with a different starting CCE) within the UT-specific search space if UTs are associated with the same return link component carrier and the first CCE of the corresponding FCI forward link grant satisfies Equation 3. For example, if a collision is indicated, the scheduler may shift the resource allocation for one of the UTs (e.g., by 2) within the UT search space.

The parameter A in Equation 3 allows for a tradeoff between return link control channel overhead and CCE collision probability. If $A=L_{CC}$, there is a 1-to-1 mapping between forward link resource allocations and return link resource indices. If $A=1$, the mapping is $L_{CC}$-to-1.

Example System

Figure 8:
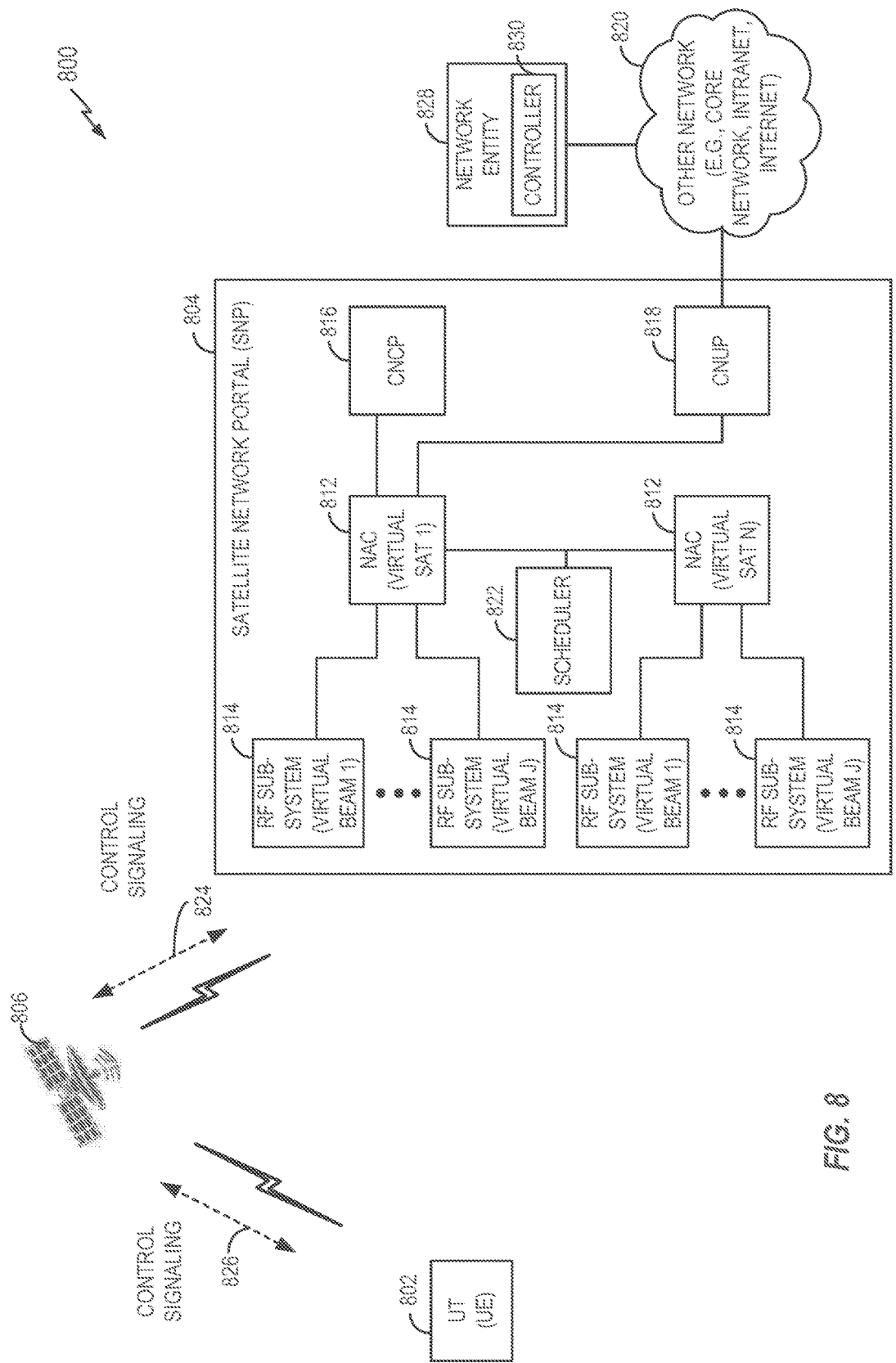
FIG. 8 is a block diagram of an example communication system in accordance with some aspects of the disclosure.

Resource allocation in accordance with the teachings herein will now be described in the context of a non-geosynchronous satellite communication system 800, such as a LEO satellite communication system for data, voice, video, or other communication, as shown in FIG. 8. Here, a UT 802 is in communication with an SNP 804 via a satellite 806. The UT 802, the SNP 804, and the satellite 806 may respectively correspond to, for example, the UT 400, the SNP 200, and the satellite 300 of FIG. 1.

The system 800 may employ more carriers for return links than for forward links. For example, the satellite 806 may send signals to multiple UTs (e.g., including the UT 802) via one forward service link and receive signals from the UTs via multiple return service links.

The SNP 804 includes network access controllers (NACs) 812, each of which interfaces with one or more radio frequency (RF) subsystems 814 for communicating with the UT 802 and other UTs (not shown) via the satellite 806 (or some other satellite, not shown). The SNP 804 also includes a core network control plane (CNCP) 816 and a core network user plane (CNUP) 818, or other similar functionality (e.g., control and user plane functionality for other types of networks), for communicating with a network 820. The network 820 may represent, for example, one or more of a core network (e.g., 3G, 4G, 5G, etc.), an intranet, or the Internet.

In some implementations, a controller 830 of a network entity 828 may determine (e.g., specify) the resource allocation algorithms (e.g., Equation 2 or 3 and associated parameters) to be used in conjunction with return link communication in the system 800. The controller 830 may determine these parameters based on, for example, information (e.g., the number of UTs being served) received via the network 820 and/or information (the number of CCEs allocated) specified by the network entity 828 or some other entity. The network entity 828 may then send this algorithm information to components of the system 800 during system startup and/or at other times. For example, the network entity 828 may transmit the algorithm information to the SNP 804 via the network 820 (e.g., a core network, an intranet, or the Internet) or some other data transfer mechanism. For purposes of illustration, the network entity 828 is depicted as being outside of the network 820. However, the network entity 828 could be part of the network 820.

In some implementations, the SNP 804 determines (e.g., receives or generates) the resource allocation algorithms to be used in conjunction with return link communication in the system 800. For example, an NAC 812 may determine the parameters it uses for Equation 3 and determine the parameters to be used for Equation 2 by all UTs under its control. The SNP 804 may determine these parameters based on, for example, information (e.g., the number of UTs being served and/or the number of CCEs allocated) acquired by the SNP 804.

When the SNP 804 has data to send to the UT 802, the SNP 804 (e.g., a scheduler 822) may send control information (e.g., indicating a forward link grant) to the UT 802 via control signaling 824 and 826. This control information is associated with a forward link index that identifies the resource for transmission of the control information. In conjunction with the selection of this index (e.g., the selection of a particular forward link resource), the scheduler 822 uses Equation 3 to determine whether the use of a particular index results in a collision between return link control information transmissions of different UTs on the same component carrier. If a potential collision is indicated, the scheduler 822 may take action as discussed herein to avoid such a return link collision. After sending the forward link control information on the designated resource, the SNP 804 sends the associated data to the UT 802 via an allocated forward link resource.

Upon receiving this data, the UT 802 generates acknowledgement information (e.g., ACK or NACK) indicative of whether the UT 802 successfully received the data. The UT 802 uses the previously received algorithm information (e.g., Equation 2) to identify the return link resource upon which the acknowledgement information is to be sent to the SNP 804 (via the satellite 806). The UT 802 then sends the acknowledgement information to the SNP 804 on the designated return link resource (e.g., via control signaling 826 and 824).

Other Communication Systems

The teachings herein could also be applicable to other types of communication systems. For example, in a communication system that includes base stations and UEs, when a base station has data to send to a UE, the base station may send control information (e.g., indicating a downlink grant) to the UE. This control information is associated with a downlink index that identifies the resource for transmission of the control information (e.g., a CCE index for the PDCCH region of a corresponding DCI assignment subframe). In conjunction with the selection of this index (e.g., the selection of a particular downlink resource), the base station uses Equation 4 to determine whether the use of a particular index results in a collision between uplink control information transmissions of different UEs on the same component uplink carrier.

$$(n_{CCE,A} - n_{CCE,B}) \bmod \left[ A \times \frac{K}{L_{CC}} \right] = 0 \qquad \text{EQUATION 4}$$

In Equation 4, $n_{CCE,A}$ is the first CCE index potentially used for transmission of a downlink grant for UE A and $n_{CCE,B}$ is the first CCE index potentially used for transmission of a downlink grant for UE B.

If a potential collision is indicated, the base station may take action as discussed herein to avoid such an uplink collision. After sending the downlink control information on the designated resource, the base station sends the associated data to the UE via an allocated downlink resource.

Upon receiving this data, the UE generates acknowledgement information (e.g., ACK or NACK) indicative of whether the UE successfully received the data. The UE then sends the acknowledgement information to the base station on the designated uplink resource. The UE uses algorithm information to identify the uplink resource upon which the acknowledgement information is to be sent to the base station. For example, a UE may use the control resource index $n_{PUCCH}^{(1)}$ set forth in Equation 5.

$$n_{PUCCH}^{(1)} = (n_{CCE}) \bmod \left\lceil A \times \frac{K}{L_{CC}} \right\rceil + N_{PUCCH}^{(1)} \quad \text{EQUATION 5}$$

In Equation 5, $n_{CCE}$ is the number of the first CCE used for transmission of a corresponding DCI assignment, $N_{PUCCH}^{(1)}$ is configured by higher layers, K is the total number of CCEs in a downlink control region (PDCCH region) of the corresponding DCI assignment sub-frame, $L_{CC}$ is the number of uplink component carriers available in the system, and A is a parameter configured through upper layer signaling. In some implementations, the range of A is: $1 \leq A \leq L_{CC}$. This resource allocation may employ N-to-one mapping between downlink CCEs and PUCCH format 1a/1b resources in each uplink carrier as taught herein.

Collision

Figure 9:
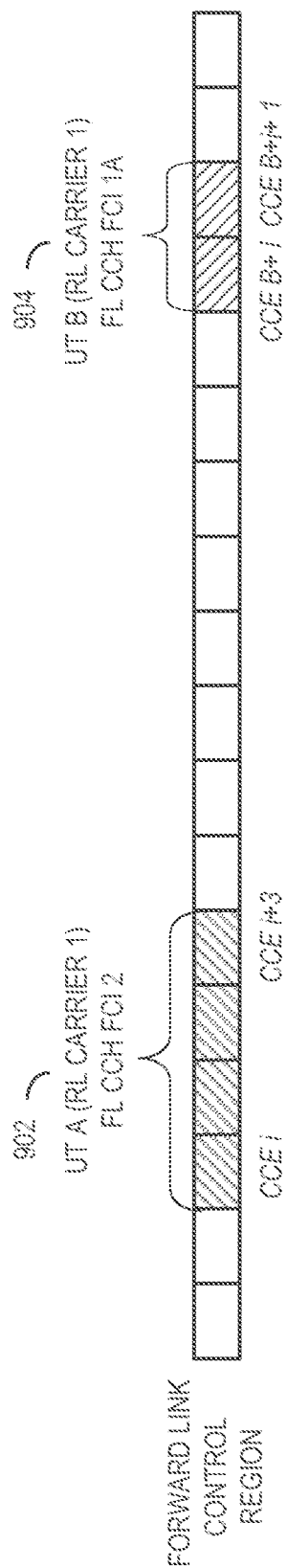
FIG. 9 is a diagram illustrating a collision in accordance with some aspects of the disclosure.

Referring now to FIGS. 9-12, issues relating to collision on the return link will now be treated in more detail. As mentioned above, potential collision between UTs' FCI assignments may happen when the UT-specific search spaces overlap each other or overlap after the modulo operation as described in Equation 3. A forward link scheduler may consider a CCE collision event based on the algorithm of Equation 3. FIG. 9 describes an example where a CCE collision occurs according to this algorithm and FIGS. 10-12 describe examples where CCE collisions do not occur according to the algorithm. These figures will refer to the parameter B as defined in Equation 6.

$$B = \left\lceil A \times \frac{K}{L_{CC}} \right\rceil \quad \text{EQUATION 6}$$

In FIG. 9, a UT A and a UT B are associated with the same return link component Carrier, RL carrier 1. The UT A potentially transmits a forward link grant by using the resources 902 corresponding to CCE i to CCE i+3. This grant may correspond to forward link (FL) control channel (CCH) FCI 2. The UT B potentially transmits a forward link grant (e.g., FCI 1A) by using the resources 904 corresponding to CCE B+i to CCE B+i+1. In this case, the first CCE of the forward link grant for the UT A and the first CCE of the forward link grant for the UT B satisfy Equation 3. Hence, a collision is indicated.

Figure 10:
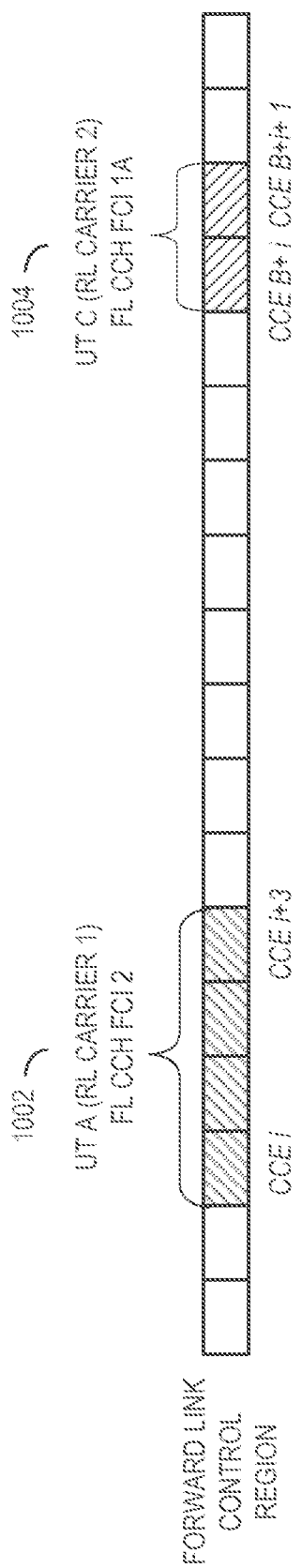
FIG. 10 is a diagram illustrating no collision in accordance with some aspects of the disclosure.

FIG. 10 shows an example where there is no CCE collision because the UTs are associated with different return link carriers. A UT A is associated with a first return link carrier, RL carrier 1. A UT C is associated with a second return link carrier, RL carrier 2. The UT A potentially transmits a forward link grant (e.g., FCI 2) by using the resources 1002 corresponding to CCE i to CCE i+3. The UT C potentially transmits a forward link grant (e.g., FCI 1A) by using the resources 1004 corresponding to CCE B+i to CCE B+i+1. Although the first CCE of the forward link grant for the UT A and the first CCE of the forward link grant for the UT C satisfy Equation 3 in this example, there is no collision because the UT A and the UT C are associated with different return link component carriers.

Figure 11:
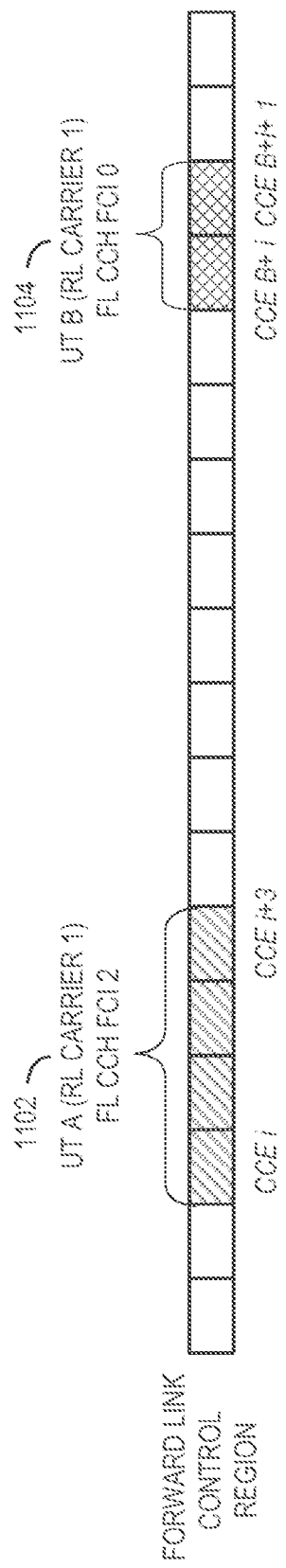
FIG. 11 is another diagram illustrating no collision in accordance with some aspects of the disclosure.

The downlink control region includes not only forward link grants, but also return link grants. FIG. 11 shows an example where there is no CCE collision since one of the FCIs is a return link grant. A UE A and a UE B are associated with the same return link component carrier, RL carrier 1. The UT A potentially transmits a forward link grant (e.g., FCI 2) by using the resources 1102 corresponding to CCE i to CCE i+3. The UT B potentially transmits a return link grant (e.g., FCI 0) by using the resources 1104 corresponding to CCE B+i to CCE B+i+1. Although the first CCE of the grant for the UT A and the first CCE of the grant for the UT B satisfy Equation 3, there is no collision since the grant for the UT B is a return link grant. Note that only the forward link grant associated with the forward link data transmission requires return link ACK/NACK feedback.

Figure 12:
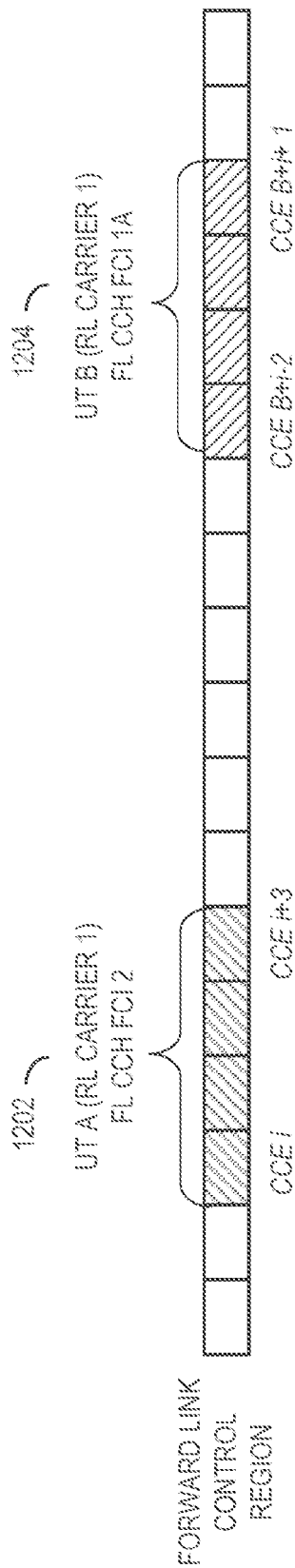
FIG. 12 is another diagram illustrating no collision in accordance with some aspects of the disclosure.

FIG. 12 shows an example where there is no CCE collision since Equation 3 is not satisfied. A UT A and a UT B are associated with the same return link component carrier, RL carrier 1. The UT A potentially transmits a forward link grant (e.g., FCI 2) by using the resources 1202 corresponding to CCE i to CCE i+3. The UT B potentially transmits a forward link grant (e.g., FCI 1A) by using the resources corresponding to CCE B+i−2 to CCE B+i+1. Although CCE B+i is used for the forward link grant for the UT B, there is no collision since the first CCE of the grant for the UT A and the first CCE of the grant for the UT B do not satisfy Equation 3.

In view of the above, a network can use any of the following three options to avoid a potential collision as defined in Equation 3. As a first option, the network can schedule UTs associated with different return link component carriers if the first CCE of the corresponding FCI forward link grant satisfies Equation 3. As a second option, the network can schedule return link grants if UTs are associated with the same return link component carrier and the first CCE of the corresponding FCI grant satisfies Equation 3. As a third option, the network can consider a different forward link control channel candidate within the UT-specific search space if UTs are associated with the same return link component carrier and the first CCE of the corresponding FCI forward link grant satisfies Equation 3.

Equation Parameters

In the algorithms for ACK/NACK feedback resource allocation for multiple component carriers as set forth in Equation 2 and Equation 3, the parameter A is configurable through radio signaling and plays a role for the tradeoff between return link control channel overhead and potential collision probability. To illustrate the function of this parameter in a communication network, the scenarios of $A = L_{CC}$ and $A = 1$ will be discussed in more detail.

As mentioned above, $L_{CC}$ is the number of return link component carriers. If a higher layer (or some other mechanism) configures $A = L_{CC}$, then there is a one-to-one mapping between forward link data control channel resource allocations, in terms of CCE, and return link control channel resource indices in each return link component carrier. This scenario is thus similar to the resource allocation of FIG. 7. In this case, the potential collision probability is lower but return link control channel overhead may be a problem for the case of multiple return link carriers.

Figure 13:
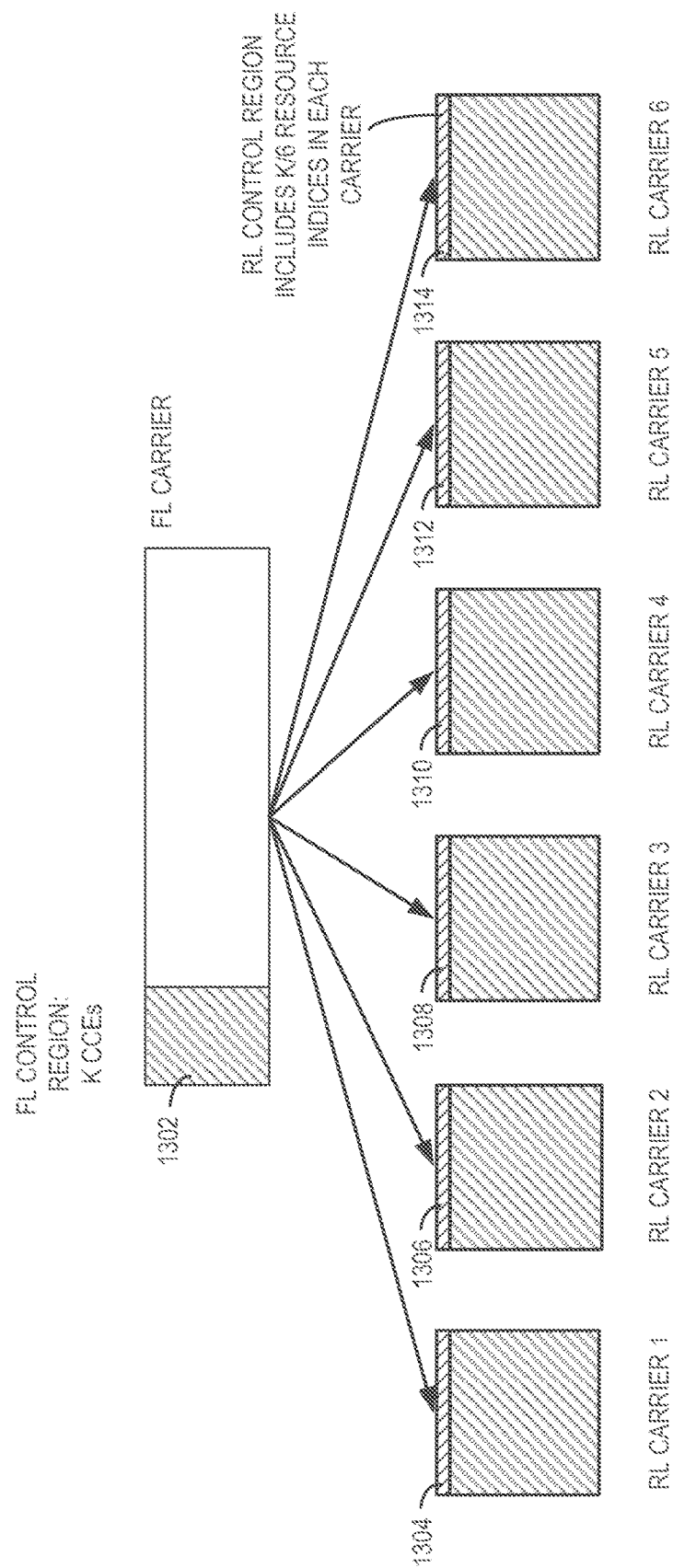
FIG. 13 is a diagram of an example resource allocation in accordance with some aspects of the disclosure.

If a higher layer (or some other mechanism) configures $A = 1$, then Equation 2 and Equation 3 involve $L_{CC}$-to-one mapping between downlink CCEs and return link control channel resources in each return link component carrier. As shown in FIG. 13, a forward link control region 1302 includes K CCEs, and the number of return link component carriers $L_{CC}=6$ in this example. By configuring A=1, the system books only K/6 resource indices for the return link control channel in each return link carrier. For example, K/6 resource indices are used for a return link control region 1304 for the return link carrier 1, K/6 resource indices are used for a return link control region 1306 for the return link carrier 2, and so on. Thus, in total, there are K return link control resource indices used for the six return link carriers of FIG. 13. Consequently, the return link control channel overhead (e.g., due to ACK/NACK feedback) is significantly reduced as compared to the $A=L_{CC}$ scenario. However, the potential collision probability is increased as compared to the $A=L_{CC}$ scenario.

Thus, in general, the network can configure the parameter A within the range $1 \leq A \leq L_{CC}$ to balance return link control channel overhead (e.g., resource overhead) and potential collision probability. In some aspects, the network may set A based on how many users are in a particular area (e.g., the number of UTs or UEs that need to be supported). In some aspects, the network may set A based on the size of the forward link (or downlink) control region (e.g., based on the magnitude of the parameter K). For example, a relatively large value of K may mean there is more overhead being used for control signaling. In this case, the network may select a smaller value for A to reduce the amount of this overhead.

Example Operations

Figure 14:
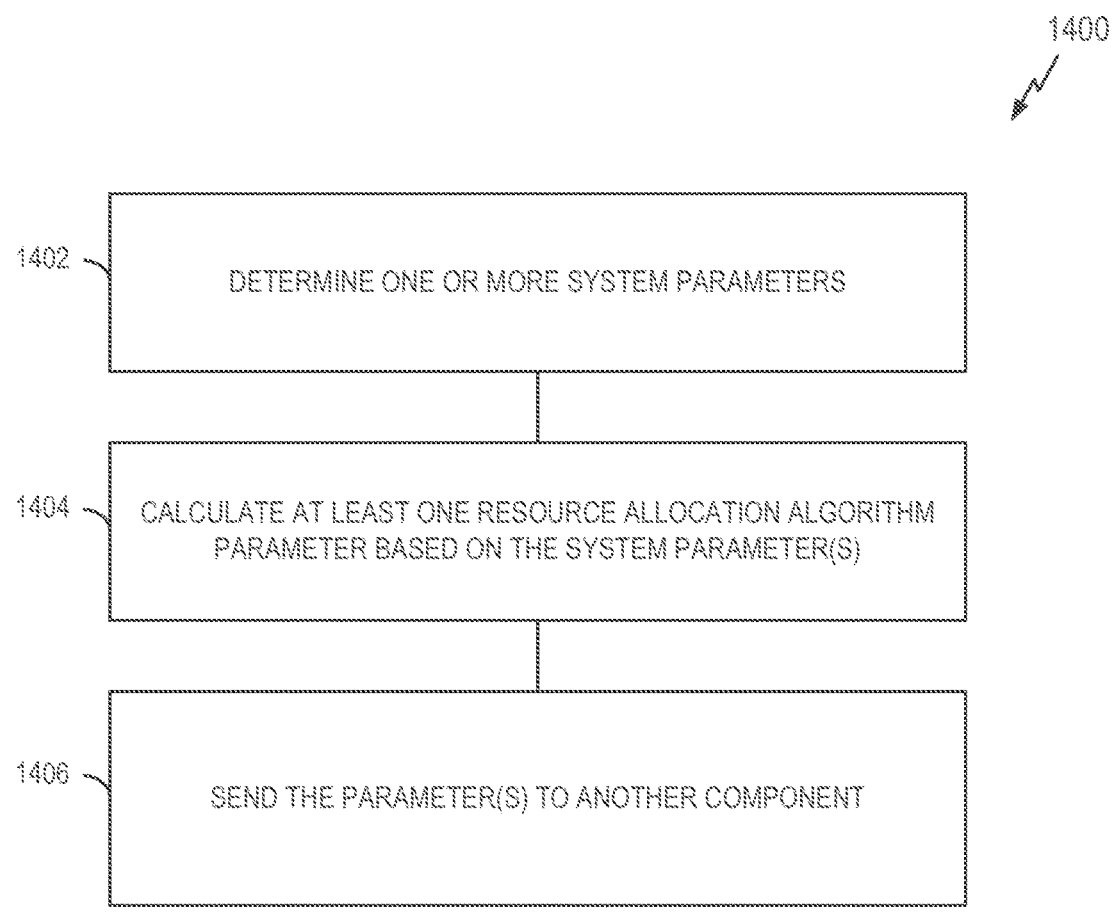
FIG. 14 is a flowchart illustrating an example of a communication process in accordance with some aspects of the disclosure.
Figure 15:
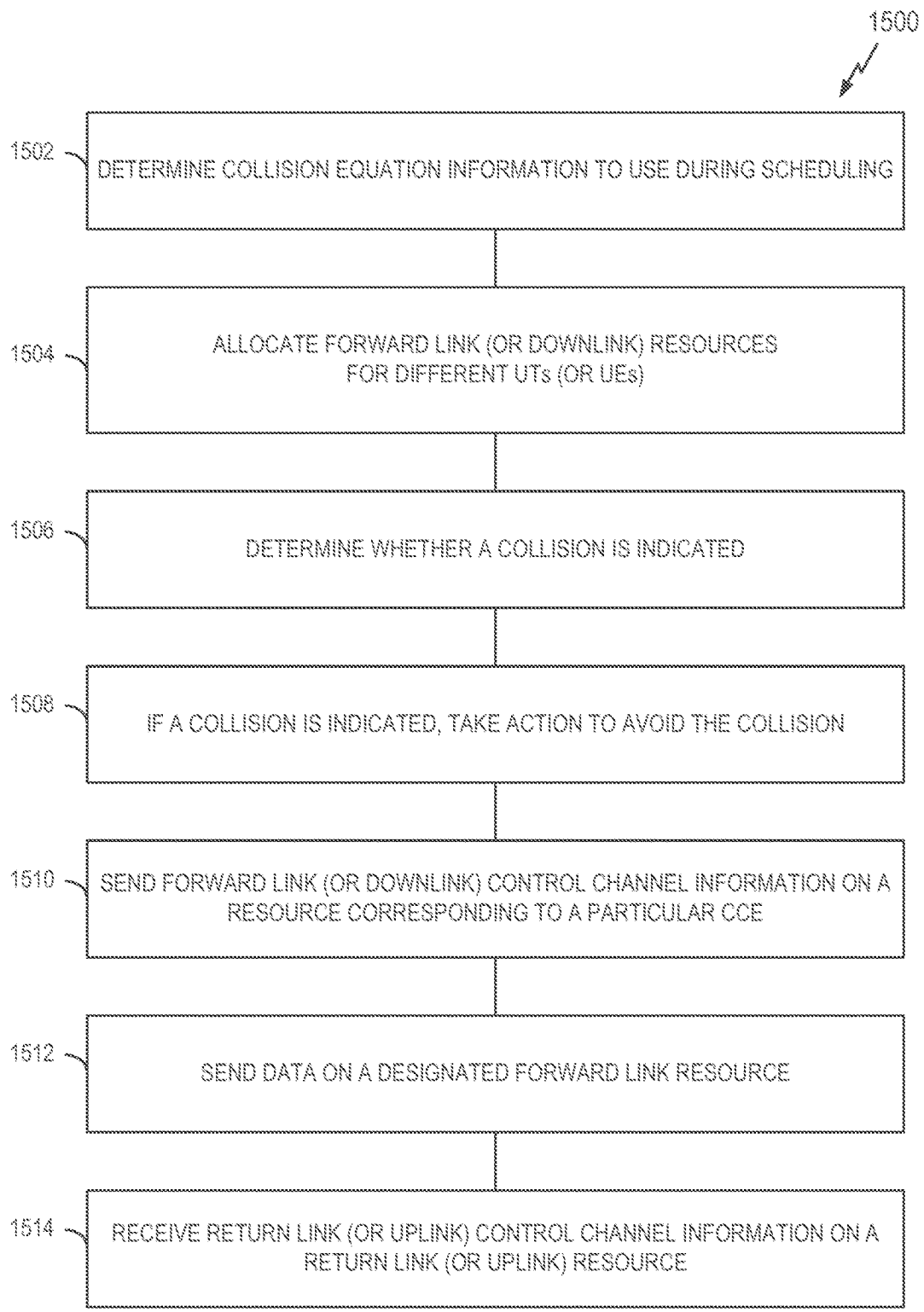
FIG. 15 is a flowchart illustrating another example of a communication process in accordance with some aspects of the disclosure.
Figure 16:
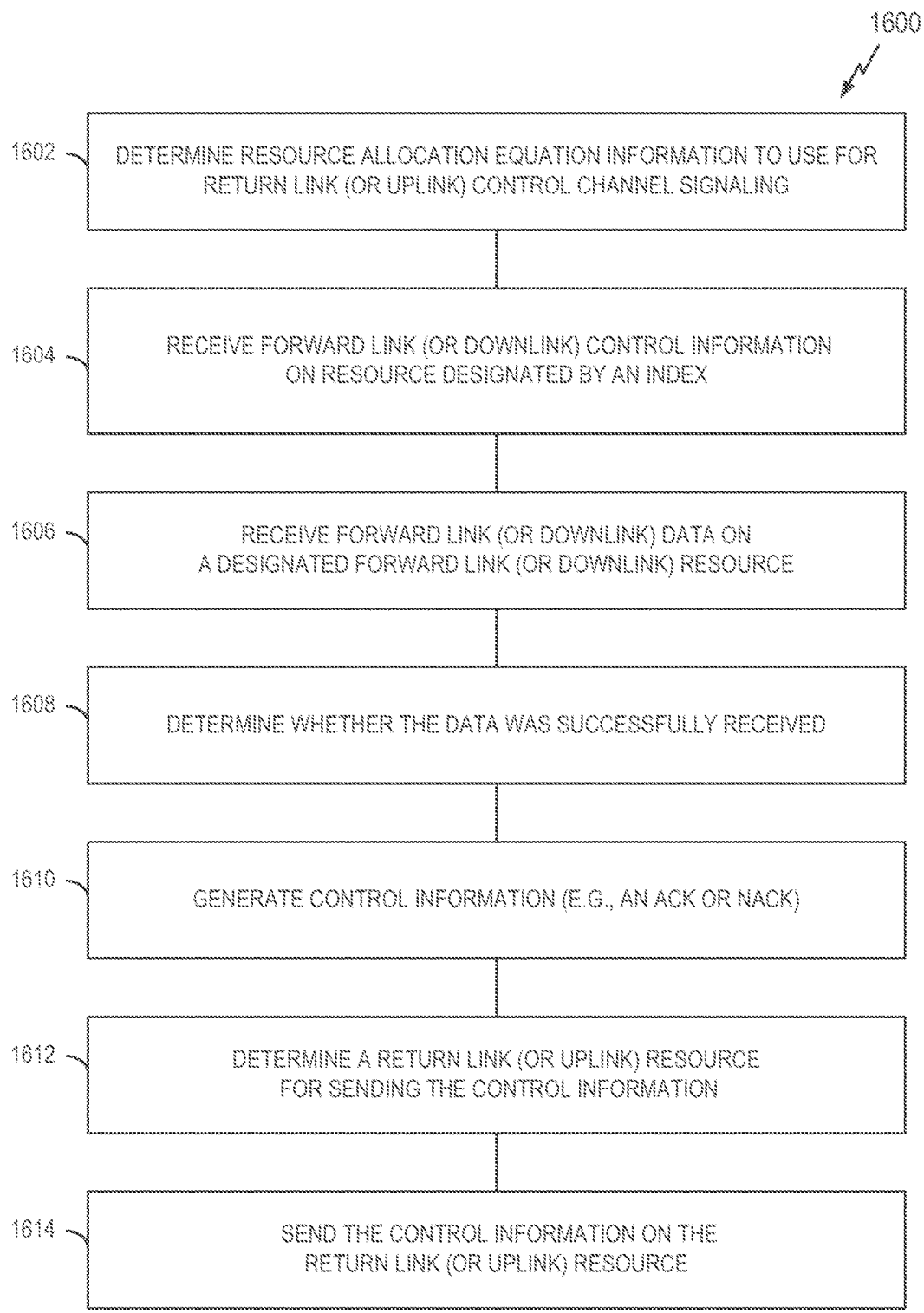
FIG. 16 is a flowchart illustrating another example of a communication process in accordance with some aspects of the disclosure.

Referring now to FIGS. 14-16, example operations that may be performed by various components of a communication system will be treated in more detail. As noted herein, these operations may be performed by different entities in different implementations.

FIG. 14 illustrates an overview of a process 1400 for determining a resource allocation-related algorithm in accordance with some aspects of the disclosure. The process 1400 may take place, at least in part, within a processing circuit (e.g., the processing circuit 1710 of FIG. 17), which may be located in a network entity, an SNP, a base station, or some other suitable apparatus. Of course, in various aspects within the scope of the disclosure, the process 1400 may be implemented by any suitable apparatus capable of supporting communication operations.

At block 1402, an apparatus (e.g., a network entity) determines one or more system parameters. For example, a network entity may determine how many UTs are being served by an SNP (or how many UEs are being served by a base station). As another example, a network entity may determine the size of the forward link (or downlink) control region. For example, the network entity may specify the value of the parameter K.

At block 1404, the apparatus calculates at least one resource allocation algorithm parameter based on the system parameter(s) determined at block 1402. For example, if there are a large number of users in an area, a larger value may be used for the parameter A to reduce the probability of collision, or vice versa.

At block 1406, the apparatus sends the parameter(s) calculated at block 1404 to another component. For example, a network entity may send the parameter A to an SNP or a UT (or to a base station or UE).

FIG. 15 illustrates an overview of a process 1500 for resource allocation and collision avoidance in accordance with some aspects of the disclosure. The process 1500 may take place, at least in part, within a processing circuit (e.g., the processing circuit 1710 of FIG. 17), which may be located in an SNP, a base station, or some other suitable apparatus. Of course, in various aspects within the scope of the disclosure, the process 1500 may be implemented by any suitable apparatus capable of supporting communication operations.

At block 1502, an apparatus (e.g., an SNP or base station) determines collision equation information to use during scheduling. For example, the apparatus may retrieve this information from a memory or receive the information from another component (e.g., a network entity).

At block 1504, the apparatus allocates forward link (or downlink) resources for different UTs (or UEs). This allocation includes assigning a number of CCEs to a forward link control region.

At block 1506, the apparatus determines whether a collision is indicated based on Equation 3. As discussed herein, Equation 3 takes into account the CCE assignments of block 1504.

At block 1508, if a collision is indicated, the apparatus takes action to avoid the collision. For example, the apparatus may schedule different UTs on different return link component carriers, schedule return link grants instead of forward link grants, or schedule a different forward link control signaling candidate that is associated with a different forward link control signaling resource allocation index.

At block 1510, the apparatus sends forward link (or downlink) control channel information on a resource corresponding to a particular CCE. For example, an SNP may send this information to a UT or a base station may send this information to a UE.

At block 1512, the apparatus sends data on a designated forward link resource. For example, an SNP may send data to a UT via a forward link or a base station may send data to a UE via a downlink.

At block 1514, the apparatus receives return link (or uplink) control channel information on a return link (or uplink) resource indicated by Equation 2. For example, an SNP may receive control channel information from a UT via a return link or a base station may receive control channel information from a UE via an uplink. In some aspects, the indicated resource is based on the CCE assignment of block 1504.

FIG. 16 illustrates an overview of a process 1600 for control channel feedback in accordance with some aspects of the disclosure. The process 1600 may take place, at least in part, within a processing circuit (e.g., the processing circuit 2210 of FIG. 22), which may be located in a UT, a UE, or some other suitable apparatus. Of course, in various aspects within the scope of the disclosure, the process 1600 may be implemented by any suitable apparatus capable of supporting communication operations.

At block 1602, an apparatus (e.g., a UT or UE) determines resource allocation equation information to use for return link (or uplink) control channel signaling. For example, the apparatus may retrieve this information from a memory or receive the information from another component (e.g., an SNP or base station).

At block 1604, the apparatus receives forward link (or downlink) control information on a resource designated by an index (e.g., corresponding to a CCE).

At block 1606, the apparatus receives forward link (or downlink) data on a designated forward link (or downlink) resource.

At block 1608, the apparatus determines whether the data was successfully received.

At block 1610, the apparatus generates control information (e.g., an ACK or NACK) indicative of the determination of block 1608.

At block 1612, the apparatus determines a return link (or uplink) resource for sending the control information. For example, the apparatus may identify a resource index according to Equation 2.

At block 1614, the apparatus sends the control information on the return link (or uplink) resource determined at block 1612.

First Example Apparatus

Figure 17:
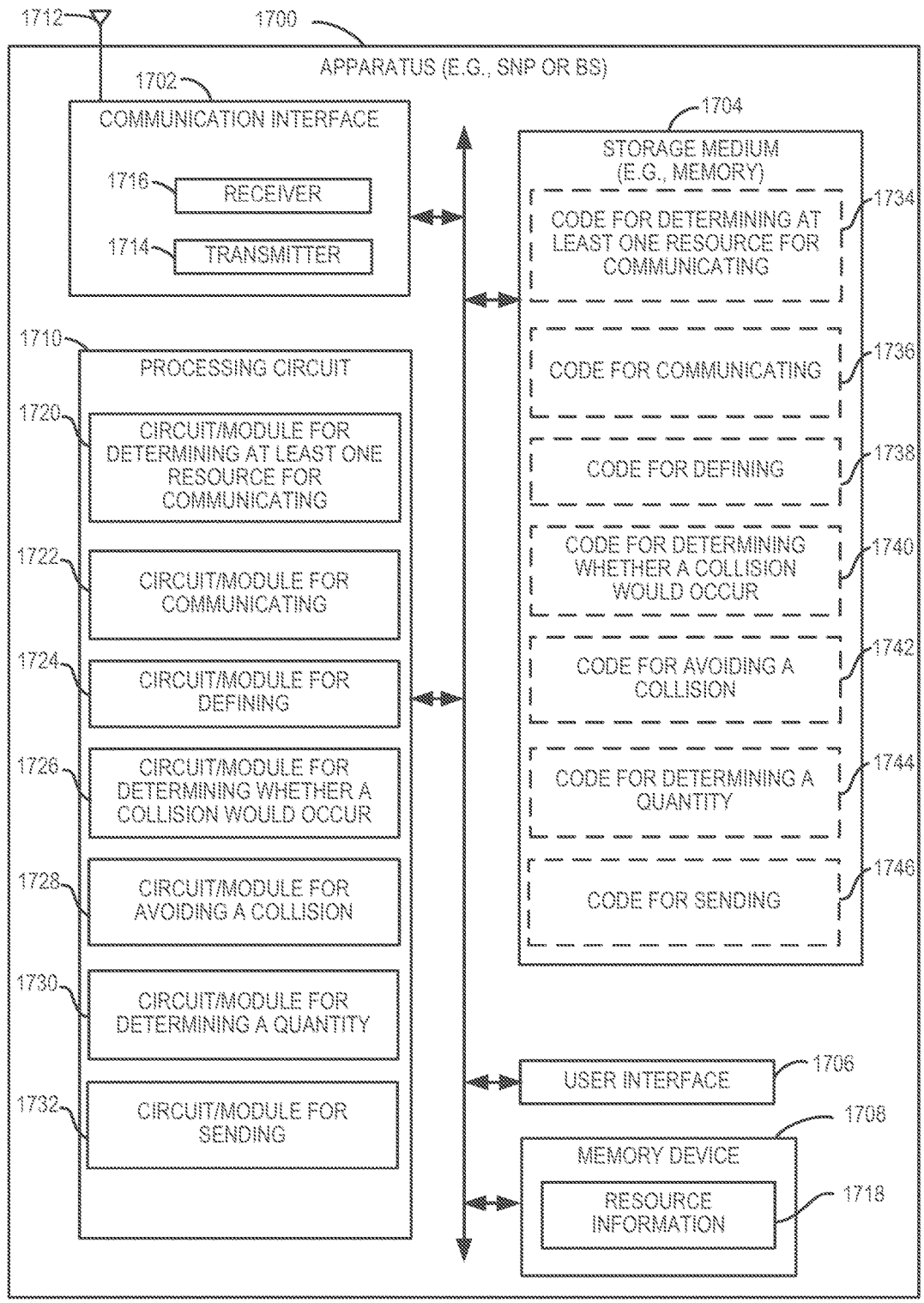
FIG. 17 is a block diagram illustrating an example hardware implementation for an apparatus (e.g., an electronic device) that can support resource allocation in accordance with some aspects of the disclosure.

FIG. 17 illustrates a block diagram of an example hardware implementation of an apparatus 1700 configured to communicate according to one or more aspects of the disclosure. For example, the apparatus 1700 could embody or be implemented within an SNP, a base station (BS), or some other type of device that supports communication. In various implementations, the apparatus 1700 could embody or be implemented within a gateway, a ground station, a vehicular component, an eNodeB, or any other electronic device having circuitry.

The apparatus 1700 includes a communication interface (e.g., at least one transceiver) 1702, a storage medium 1704, a user interface 1706, a memory device (e.g., a memory circuit) 1708, and a processing circuit 1710 (e.g., at least one processor). In various implementations, the user interface 1706 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 17. The signaling bus may include any number of interconnecting buses and bridges depending on the specific application of the processing circuit 1710 and the overall design constraints. The signaling bus links together various circuits such that each of the communication interface 1702, the storage medium 1704, the user interface 1706, and the memory device 1708 are coupled to and/or in electrical communication with the processing circuit 1710. The signaling bus may also link various other circuits (not shown) such as timing sources, peripherals, voltage regulators, and power management circuits, which are well known in the art, and therefore, will not be described any further.

The communication interface 1702 provides a means for communicating with other apparatuses over a transmission medium. In some implementations, the communication interface 1702 includes circuitry and/or programming adapted to facilitate the communication of information bi-directionally with respect to one or more communication devices in a network. In some implementations, the communication interface 1702 is adapted to facilitate wireless communication of the apparatus 1700. In these implementations, the communication interface 1702 may be coupled to one or more antennas 1712 as shown in FIG. 17 for wireless communication within a wireless communication system. The communication interface 1702 can be configured with one or more standalone receivers and/or transmitters, as well as one or more transceivers. In the illustrated example, the communication interface 1702 includes a transmitter 1714 and a receiver 1716. The communication interface 1702 serves as one example of a means for receiving and/or means transmitting.

The memory device 1708 may represent one or more memory devices. As indicated, the memory device 1708 may maintain resource-related information 1718 along with other information used by the apparatus 1700. In some implementations, the memory device 1708 and the storage medium 1704 are implemented as a common memory component. The memory device 1708 may also be used for storing data that is manipulated by the processing circuit 1710 or some other component of the apparatus 1700.

The storage medium 1704 may represent one or more computer-readable, machine-readable, and/or processor-readable devices for storing programming, such as processor executable code or instructions (e.g., software, firmware), electronic data, databases, or other digital information. The storage medium 1704 may also be used for storing data that is manipulated by the processing circuit 1710 when executing programming. The storage medium 1704 may be any available media that can be accessed by a general purpose or special purpose processor, including portable or fixed storage devices, optical storage devices, and various other mediums capable of storing, containing or carrying programming.

By way of example and not limitation, the storage medium 1704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1704 may be embodied in an article of manufacture (e.g., a computer program product). By way of example, a computer program product may include a computer-readable medium in packaging materials. In view of the above, in some implementations, the storage medium 1704 may be a non-transitory (e.g., tangible) storage medium.

The storage medium 1704 may be coupled to the processing circuit 1710 such that the processing circuit 1710 can read information from, and write information to, the storage medium 1704. That is, the storage medium 1704 can be coupled to the processing circuit 1710 so that the storage medium 1704 is at least accessible by the processing circuit 1710, including examples where at least one storage medium is integral to the processing circuit 1710 and/or examples where at least one storage medium is separate from the processing circuit 1710 (e.g., resident in the apparatus 1700, external to the apparatus 1700, distributed across multiple entities, etc.).

Programming stored by the storage medium 1704, when executed by the processing circuit 1710, causes the processing circuit 1710 to perform one or more of the various functions and/or process operations described herein. For example, the storage medium 1704 may include operations configured for regulating operations at one or more hardware blocks of the processing circuit 1710, as well as to utilize the communication interface 1702 for wireless communication utilizing their respective communication protocols.

The processing circuit 1710 is generally adapted for processing, including the execution of such programming stored on the storage medium 1704. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1710 is arranged to obtain, process and/or send data, control data access and storage, issue commands, and control other desired operations. The processing circuit 1710 may include circuitry configured to implement desired programming provided by appropriate media in at least one example. For example, the processing circuit 1710 may be implemented as one or more processors, one or more controllers, and/or other structure configured to execute executable programming. Examples of the processing circuit 1710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1710 are for illustration and other suitable configurations within the scope of the disclosure are also contemplated.

According to one or more aspects of the disclosure, the processing circuit 1710 may be adapted to perform any or all of the features, processes, functions, operations and/or routines for any or all of the apparatuses described herein. For example, the processing circuit 1710 may be configured to perform any of the steps, functions, and/or processes described with respect to FIGS. 15 and 18-21. As used herein, the term "adapted" in relation to the processing circuit 1710 may refer to the processing circuit 1710 being one or more of configured, employed, implemented, and/or programmed to perform a particular process, function, operation and/or routine according to various features described herein.

The processing circuit 1710 may be a specialized processor, such as an application specific integrated circuit (ASIC) that serves as a means for (e.g., structure for) carrying out any one of the operations described in conjunction with FIGS. 15 and 18-21. The processing circuit 1710 serves as one example of a means for transmitting and/or a means for receiving. In some implementations, the processing circuit 1710 may provide, at least in part, the functionality of at least one of: the controller 122 of FIG. 1, the SNP controller 250 of FIG. 2, or the SNP 804 of FIG. 8.

According to at least one example of the apparatus 1700, the processing circuit 1710 may include one or more of a circuit/module for determining at least one resource for communicating 1720, a circuit/module for communicating 1722, a circuit/module for defining 1724, a circuit/module for determining whether a collision would occur 1726, a circuit/module for avoiding a collision 1728, a circuit/module for determining a quantity 1730, or a circuit/module for sending 1732. In various implementations, the circuit/module for determining at least one resource for communicating 1720, the circuit/module for communicating 1722, the circuit/module for defining 1724, the circuit/module for determining whether a collision would occur 1726, the circuit/module for avoiding a collision 1728, the circuit/module for determining a quantity 1730, or the circuit/module for sending 1732 may correspond, at least in part, to the controller 122 of FIG. 1, the SNP controller 250 of FIG. 2, or the SNP 804 of FIG. 8.

The circuit/module for determining at least one resource for communicating 1720 may include circuitry and/or programming (e.g., code for determining at least one resource for communicating 1734 stored on the storage medium 1704) adapted to perform several functions relating to, for example, determining at least one resource for communicating return link control information. In some aspects, the determination may be based on: 1) a quantity of control channel indices allocated for forward link control signaling, and 2) a quantity of return link carriers. For example, in some implementations, the circuit/module for determining at least one resource for communicating 1720 performs the operations described above with reference to Equation 2 or Equation 5.

The circuit/module for communicating 1722 may include circuitry and/or programming (e.g., code for communicating 1736 stored on the storage medium 1704) adapted to perform several functions relating to, for example, communicating return link control information. In some implementations, the circuit/module for communicating 1722 receives information (e.g., from the communication interface 1702 or some other component of the apparatus 1700), processes (e.g., decodes) the information, and sends the information to another component (e.g., the memory device 1708). In some aspects, the information may be communicated via the at least one resource determined by the circuit/module for determining at least one resource for communicating 1720. For example, in some implementations, the circuit/module for communicating 1722 decodes information received on a particular resource (e.g., processes the information received over designated time slots and/or tones). In some implementations, the circuit/module for communicating 1722 is a transceiver. In some implementations, the circuit/module for communicating 1722 is a receiver. In some implementations, the communication interface 1702 includes the circuit/module for communicating 1722 and/or the code for communicating 1736.

The circuit/module for defining 1724 may include circuitry and/or programming (e.g., code for defining 1738 stored on the storage medium 1704) adapted to perform several functions relating to, for example, defining a control parameter. In some implementations, the circuit/module for defining 1724 defines the control parameter based on a quantity of users in a coverage area and/or a size of a forward link control region. For example, the circuit/module for defining 1724 may define a control parameter as discussed above in the Equation Parameters section.

The circuit/module for determining whether a collision would occur 1726 may include circuitry and/or programming (e.g., code for determining whether a collision would occur 1740 stored on the storage medium 1704) adapted to perform several functions relating to, for example, determining whether a collision associated with resource allocations for return link control signaling would occur. In some aspects, this determination may be based on whether a forward link grant allocation index for one user terminal is equal to an allocation index for another user terminal under a modulo operation. For example, in some implementations, the circuit/module for whether a collision would occur 1726 may perform the operations described above with reference to Equation 3 or Equation 4.

The circuit/module for avoiding a collision 1728 may include circuitry and/or programming (e.g., code for avoiding a collision 1742 stored on the storage medium 1704) adapted to perform several functions relating to, for example, avoiding a collision associated with resource allocations for return link control signaling. In some implementations, the circuit/module for avoiding a collision 1728 avoids a collision by scheduling user terminals on different return link carriers (e.g., as discussed above in the Collision section). In some implementations, the circuit/module for avoiding a collision 1728 avoids a collision by scheduling a return link grant instead of a forward link grant (e.g., as discussed above in the Collision section). In some implementations, the circuit/module for avoiding a collision 1728 avoids a collision by using a different control channel candidate associated with a different index of a first control channel element (CCE) for forward link control signaling (e.g., as discussed above in the Collision section). In some scenarios, the circuit/module for avoiding a collision 1728 triggers collision avoidance operations in response to an indication that a collision may occur (e.g., the indication may be received from the circuit/module for whether a collision would occur 1726 or retrieved from the memory device 1708).

The circuit/module for determining a quantity 1730 may include circuitry and/or programming (e.g., code for determining a quantity 1744 stored on the storage medium 1704) adapted to perform several functions relating to, for example, determining a quantity of control channel candidates (e.g., one or more CCEs) allocated for the forward link control signaling. For example, in some implementations, the circuit/module for determining a quantity 1730 determines which resource blocks will be (or have been) allocated for signaling control channel information on the forward link. To this end, the circuit/module for determining a quantity 1730 may select the allocated resource blocks or obtain identifiers of the allocated resource blocks. In the former scenario, the circuit/module for determining a quantity 1730 may include a scheduler that: 1) determines the number of resource blocks needed for a communication (e.g., with a UE) based on the amount and/or type of traffic being communicated, 2) identifies free resource blocks, and 3) selects the specific resource blocks to be used. In the latter scenario, the circuit/module for determining a quantity 1730 may receive the indication via the communication interface 1702 or retrieve the indication from the memory device 1708.

The circuit/module for sending 1732 may include circuitry and/or programming (e.g., code for sending 1746 stored on the storage medium 1704) adapted to perform several functions relating to, for example, sending information (e.g., forward link control information) via a resource. In some implementations, the circuit/module for sending 1732 receives information (e.g., from a component of the apparatus 1700), processes (e.g., encodes) the information, and sends the information to another component (e.g., the communication interface 1702) that will transmit the information. In some aspects, the information may be sent via a resource indicated by one of the control channel candidates allocated for the forward link control signaling. For example, in some implementations, the circuit/module for sending 1732 encodes information for transmission on a particular resource (e.g., prepares the information to be sent over designated time slots and/or tones). In some implementations, the circuit/module for sending 1732 is a transceiver. In some implementations, the circuit/module for sending 1732 is a transmitter. In some implementations, the communication interface 1702 includes the circuit/module for sending 1732 and/or the code for sending 1746. In some implementations, the functionality of the circuit/module for sending 1732 is incorporated into (or provided by) the circuit/module for communicating 1722.

As mentioned above, programming stored by the storage medium 1704, when executed by the processing circuit 1710, causes the processing circuit 1710 to perform one or more of the various functions and/or process operations described herein. For example, the programming, when executed by the processing circuit 1710, may cause the processing circuit 1710 to perform the various functions, steps, and/or processes described herein with respect to FIGS. 15 and 18-21 in various implementations. As shown in FIG. 17, the storage medium 1704 may include one or more of the code for determining at least one resource for communicating 1734, the code for communicating 1736, the code for defining 1738, the code for determining whether a collision would occur 1740, the code for avoiding a collision 1742, the code for determining a quantity 1744, or the code for sending 1746.

First Example Process

Figure 18:
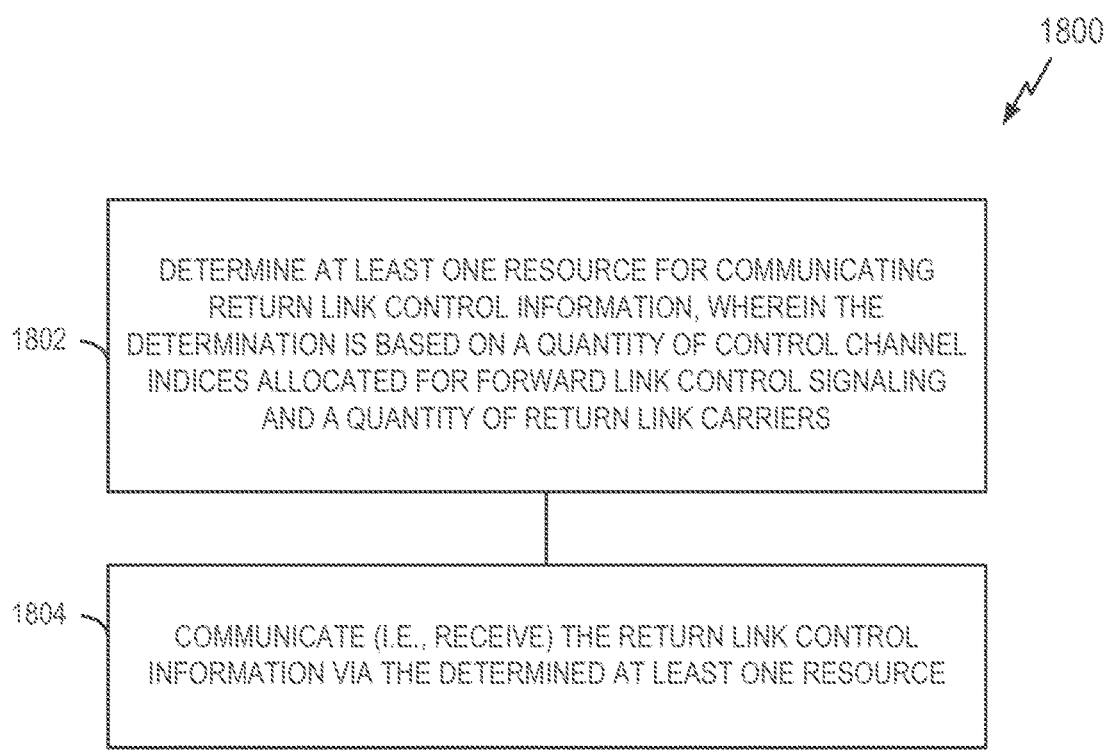
FIG. 18 is a flowchart illustrating an example of a communication process in accordance with some aspects of the disclosure.

FIG. 18 illustrates a process 1800 for communication in accordance with some aspects of the disclosure. The process 1800 may take place within a processing circuit (e.g., the processing circuit 1710 of FIG. 17), which may be located in an SNP, a BS, or some other suitable apparatus. In some implementations, the process 1800 may be performed by an SNP for at least one non-geosynchronous satellite. In some implementations, the process 1800 represents operations performed, at least in part, by at least one of: the controller 122 of FIG. 1, the SNP controller 250 of FIG. 2, or the SNP 804 of FIG. 8. Of course, in various aspects within the scope of the disclosure, the process 1800 may be implemented by any suitable apparatus capable of supporting communication operations.

At block 1802, an apparatus (e.g., an SNP or a BS) determines at least one resource for communicating return link control information. In some aspects, the determination may be based on a quantity of control channel indices allocated for forward link control signaling and a quantity of return link carriers. For example, the determination may be based on Equation 2 or Equation 4.

In some aspects, the forward link control channel indices (i.e., the control channel indices allocated for forward link control signaling) may be control channel element (CCE) indices. In some aspects, the return link control information may be hybrid automatic repeat request (HARQ) feedback. In some aspects, a ratio of the quantity of control channel indices allocated for forward link control signaling to a quantity of resources allocated in each return link carrier for communicating the return link control information is N-to-1, where N is greater than 1.

In some aspects, the determination of the at least one resource for communicating return link control information includes scheduling more than one user terminal communicating return link control information within a single transmission time interval.

In some aspects, the determination of the at least one resource for communicating return link control information is based on a control parameter that is defined to balance return link control resource overhead and a likelihood of collision associated with resource allocations for return link control signaling (e.g., in a multiple return link carrier scenario). In some aspects, the determination of the at least one resource for communicating return link control information includes performing a modulo operation based on the quantity of control channel indices allocated for forward link control signaling, the quantity of return link carriers, and the control parameter.

In some aspects, the determination of the at least one resource for communicating return link control information includes performing a modulo operation on a control channel index associated with forward link data transmission.

In some implementations, the circuit/module for determining at least one resource for communicating 1720 of FIG. 17 performs the operations of block 1802. In some implementations, the code for determining at least one resource for communicating 1734 of FIG. 17 is executed to perform the operations of block 1802.

At block 1804, the apparatus communicates (i.e., receives) the return link control information via the at least one resource determined at block 1802. For example, an SNP may receive return link control information from a UT, or a BS may receive uplink control information from a UE.

In some implementations, the circuit/module for communicating 1722 of FIG. 17 performs the operations of block 1804. In some implementations, the code for communicating 1736 of FIG. 17 is executed to perform the operations of block 1804.

Second Example Process

Figure 19:
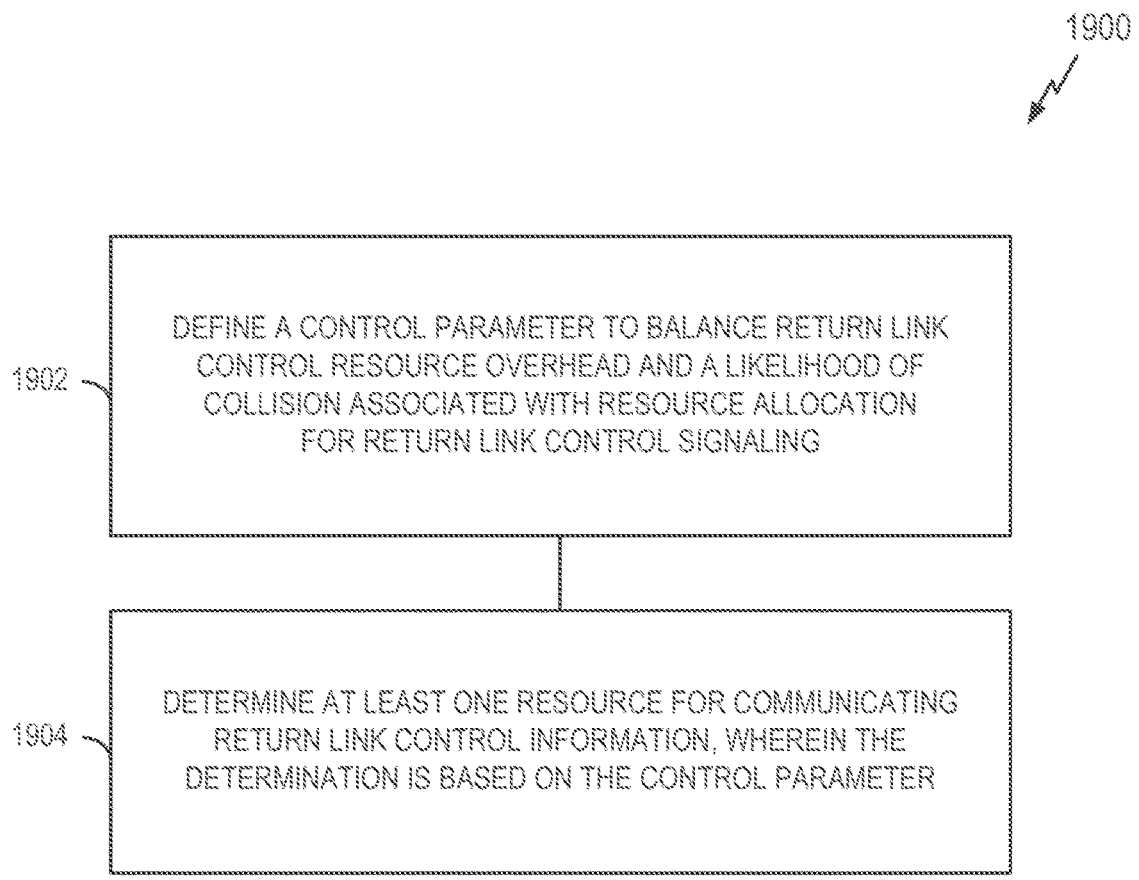
FIG. 19 is a flowchart illustrating an example of a process for determining a resource in accordance with some aspects of the disclosure.

FIG. 19 illustrates a process 1900 for communication in accordance with some aspects of the disclosure. In some implementations, the process 1900 may be performed in addition to (e.g., in conjunction with) the process 1800 of FIG. 18. The process 1900 may take place within a processing circuit (e.g., the processing circuit 1710 of FIG. 17), which may be located in an SNP, a BS, or some other suitable apparatus. In some implementations, the process 1900 may be performed by an SNP for at least one non-geosynchronous satellite. In some implementations, the process 1900 represents operations performed, at least in part, by at least one of: the controller 122 of FIG. 1, the SNP controller 250 of FIG. 2, or the SNP 804 of FIG. 8. Of course, in various aspects within the scope of the disclosure, the process 1900 may be implemented by any suitable apparatus capable of supporting communication operations.

At block 1902, an apparatus (e.g., an SNP or a BS) defines a control parameter to balance return link control resource overhead and a likelihood of collision associated with resource allocations for return link control signaling (e.g., in a multiple return link carrier scenario). In some aspects, the control parameter may be defined based on a quantity of users in a coverage area. In some aspects, the control parameter may be defined based on a size of a forward link control region.

In some implementations, the circuit/module for defining 1724 of FIG. 17 performs the operations of block 1902. In some implementations, the code for defining 1738 of FIG. 17 is executed to perform the operations of block 1902.

At block 1904, the apparatus determines at least one resource for communicating return link control information. In some aspects, the determination may be based on the control parameter defined at block 1902. For example, the determination may be based on Equation 2 or Equation 5.

In some implementations, the circuit/module for communicating 1722 of FIG. 17 performs the operations of block 1904. In some implementations, the code for communicating 1736 of FIG. 17 is executed to perform the operations of block 1904.

Third Example Process

Figure 20:
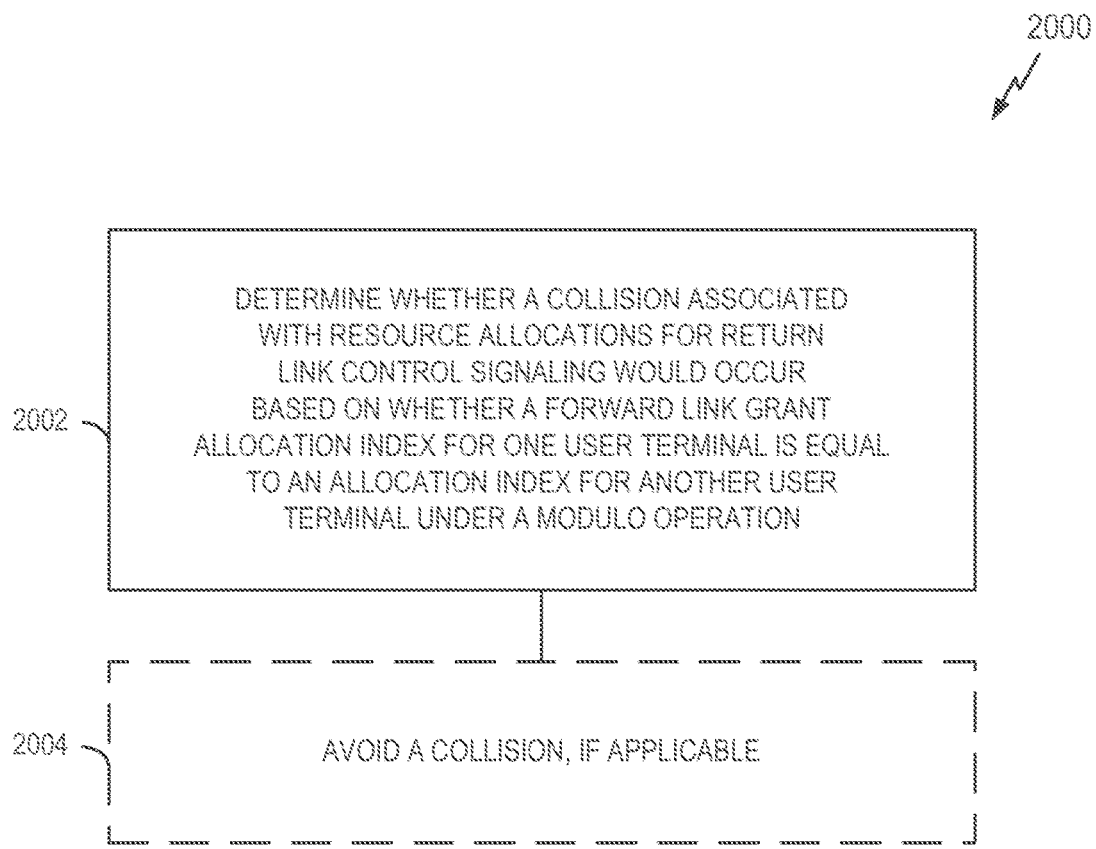
FIG. 20 is a flowchart illustrating an example of a collision process in accordance with some aspects of the disclosure.

FIG. 20 illustrates a process 2000 for communication in accordance with some aspects of the disclosure. In some implementations, the process 2000 may be performed in addition to (e.g., in conjunction with) the process 1800 of FIG. 18. The process 2000 may take place within a processing circuit (e.g., the processing circuit 1710 of FIG. 17), which may be located in an SNP, a BS, or some other suitable apparatus. In some implementations, the process 2000 may be performed by an SNP for at least one non-geosynchronous satellite. In some implementations, the process 2000 represents operations performed, at least in part, by at least one of: the controller 122 of FIG. 1, the SNP controller 250 of FIG. 2, or the SNP 804 of FIG. 8. Of course, in various aspects within the scope of the disclosure, the process 2000 may be implemented by any suitable apparatus capable of supporting communication operations.

At block 2002, an apparatus (e.g., an SNP or a BS) determines whether a collision associated with resource allocations for return link control signaling would occur based on whether a forward link grant allocation index for one user terminal is equal to an allocation index for another user terminal under a modulo operation.

In some implementations, the circuit/module for determining whether a collision would occur 1726 of FIG. 17 performs the operations of block 2002. In some implementations, the code for determining whether a collision would occur 1740 of FIG. 17 is executed to perform the operations of block 2002.

At optional block 2004, the apparatus may avoid a collision (e.g., if a collision is indicated at block 2002). For example, the apparatus may avoid a collision by scheduling user terminals on different return link carriers. As another example, the apparatus may avoid a collision by scheduling a return link grant instead of a forward link grant. As yet another example, the apparatus may avoid a collision by using a different control channel candidate associated with a different index of a first control channel element for forward link control signaling.

In some implementations, the circuit/module for avoiding a collision 1728 of FIG. 17 performs the operations of block 2004. In some implementations, the code for avoiding a collision 1742 of FIG. 17 is executed to perform the operations of block 2004.

Fourth Example Process

Figure 21:
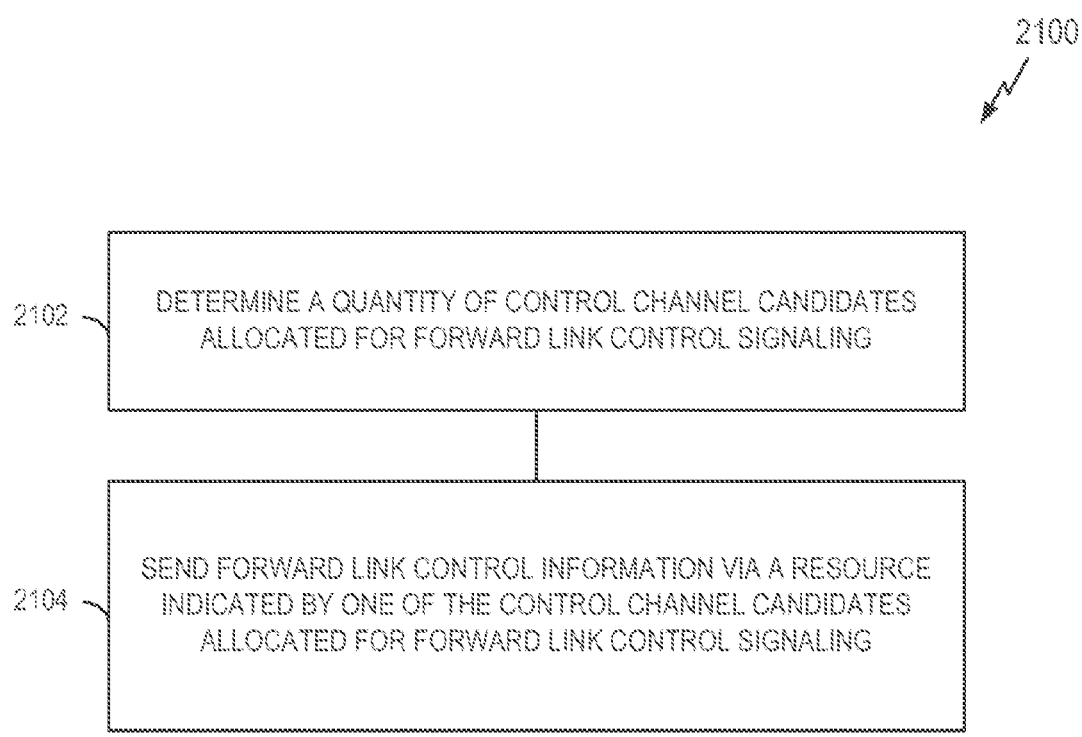
FIG. 21 is a flowchart illustrating an example of a communication process in accordance with some aspects of the disclosure.

FIG. 21 illustrates a process 2100 for communication in accordance with some aspects of the disclosure. In some implementations, the process 2100 may be performed in addition to (e.g., in conjunction with) the process 1800 of FIG. 18. The process 2100 may take place within a processing circuit (e.g., the processing circuit 1710 of FIG. 17), which may be located in an SNP, a BS, or some other suitable apparatus. In some implementations, the process 2100 may be performed by an SNP for at least one non-geosynchronous satellite. In some implementations, the process 2100 represents operations performed, at least in part, by at least one of: the controller 122 of FIG. 1, the SNP controller 250 of FIG. 2, or the SNP 804 of FIG. 8. Of course, in various aspects within the scope of the disclosure, the process 2100 may be implemented by any suitable apparatus capable of supporting communication operations.

At block 2102, an apparatus (e.g., an SNP or a BS) determines a quantity of control channel candidates allocated for the forward link control signaling.

In some implementations, the circuit/module for determining a quantity 1730 of FIG. 17 performs the operations of block 2102. In some implementations, the code for determining a quantity 1744 of FIG. 17 is executed to perform the operations of block 2102.

At block 2104, the apparatus sends forward link control information via a resource indicated by one of the control channel candidates allocated for the forward link control signaling.

In some implementations, the circuit/module for sending 1732 of FIG. 17 performs the operations of block 2104. In some implementations, the code for sending 1746 of FIG. 17 is executed to perform the operations of block 2104.

Second Example Apparatus

Figure 22:
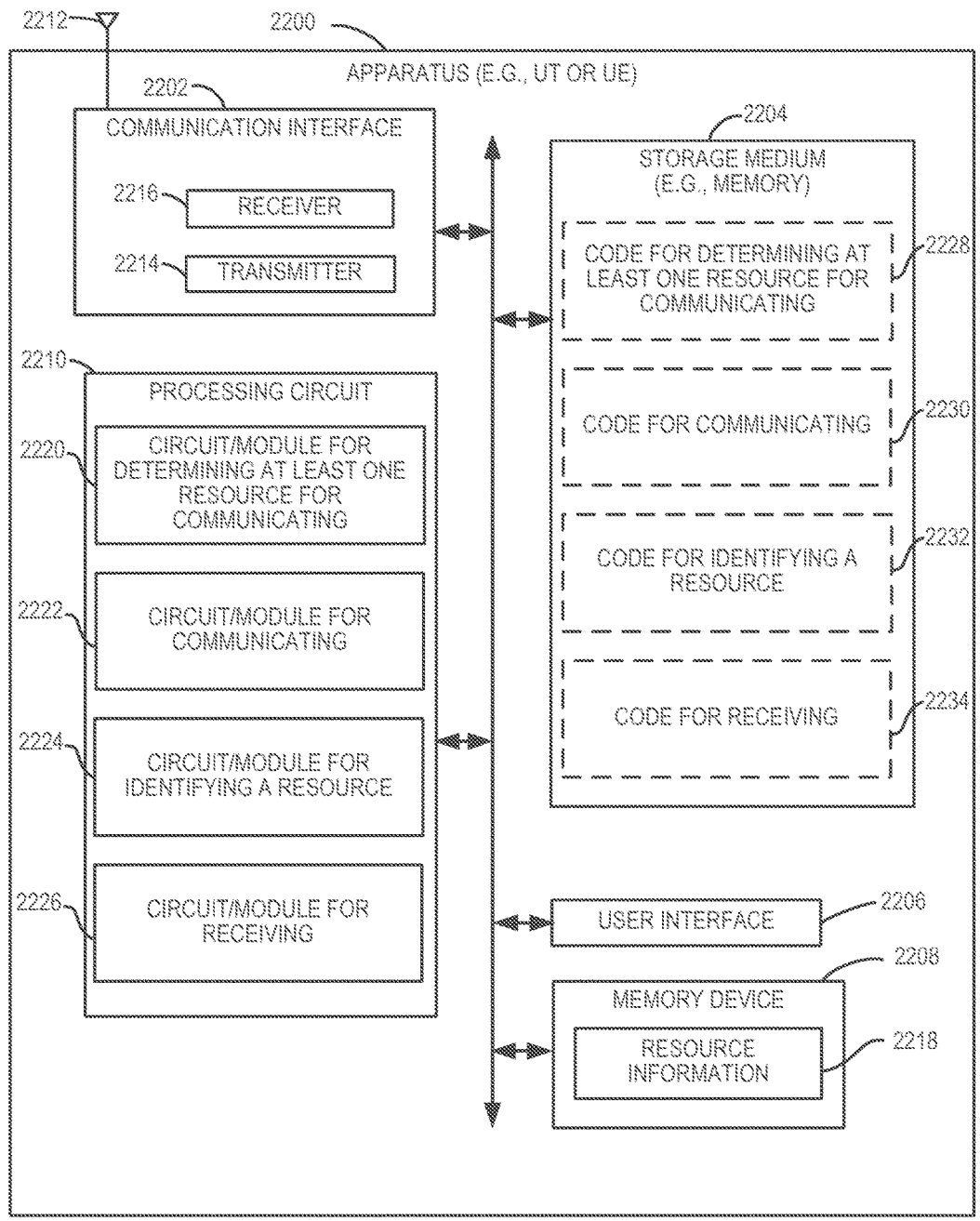
FIG. 22 is a block diagram illustrating an example hardware implementation for another apparatus (e.g., an electronic device) that can support resource allocation in accordance with some aspects of the disclosure.

FIG. 22 illustrates a block diagram of an example hardware implementation of another apparatus 2200 configured to communicate according to one or more aspects of the disclosure. For example, the apparatus 2200 could embody or be implemented within a UT, a UE, or some other type of device that supports communication. In various implementations, the apparatus 2200 could embody or be implemented within an access terminal, a vehicular component, or any other electronic device having circuitry.

The apparatus 2200 includes a communication interface (e.g., at least one transceiver) 2202, a storage medium 2204, a user interface 2206, a memory device 2208 (e.g., storing resource-related information 2218), and a processing circuit 2210 (e.g., at least one processor). In various implementations, the user interface 2206 may include one or more of: a keypad, a display, a speaker, a microphone, a touchscreen display, of some other circuitry for receiving an input from or sending an output to a user. The communication interface 2202 may be coupled to one or more antennas 2212, and may include a transmitter 2214 and a receiver 2216. In general, the components of FIG. 22 may be similar to corresponding components of the apparatus 1700 of FIG. 17.

According to one or more aspects of the disclosure, the processing circuit 2210 may be adapted to perform any or all of the features, processes, functions, operations and/or routines for any or all of the apparatuses described herein. For example, the processing circuit 2210 may be configured to perform any of the steps, functions, and/or processes described with respect to FIGS. 16 and 23-25. As used herein, the term "adapted" in relation to the processing circuit 2210 may refer to the processing circuit 2210 being one or more of configured, employed, implemented, and/or programmed to perform a particular process, function, operation and/or routine according to various features described herein.

The processing circuit 2210 may be a specialized processor, such as an application specific integrated circuit (ASIC) that serves as a means for (e.g., structure for) carrying out any one of the operations described in conjunction with FIGS. 16 and 23-25. The processing circuit 2210 serves as one example of a means for transmitting and/or a means for receiving. In some implementations, the processing circuit 2210 may provide, at least in part, the functionality of at least one of: the controller 126 of FIG. 1 or the control processor 420 of FIG. 4.

According to at least one example of the apparatus 2200, the processing circuit 2210 may include one or more of a circuit/module for determining at least one resource for communicating 2220, a circuit/module for communicating 2222, a circuit/module for identifying a resource 2224, or a circuit/module for receiving 2226. In various implementations, the circuit/module for determining at least one resource for communicating 2220, the circuit/module for communicating 2222, the circuit/module for identifying a resource 2224, or the circuit/module for receiving 2226 may correspond, at least in part, to the controller 126 of FIG. 1 or the control processor 420 of FIG. 4.

The circuit/module for determining at least one resource for communicating 2220 may include circuitry and/or programming (e.g., code for determining at least one resource for communicating 2228 stored on the storage medium 2204) adapted to perform several functions relating to, for example, determining at least one resource for communicating return link control information. In some aspects, the determination may be based on: 1) a quantity of control channel indices allocated for forward link control signaling, and 2) a quantity of return link carriers. For example, in some implementations, the circuit/module for determining at least one resource for communicating 2220 performs the operations described above with reference to Equation 2 or Equation 5.

The circuit/module for communicating 2222 may include circuitry and/or programming (e.g., code for communicating 2230 stored on the storage medium 2204) adapted to perform several functions relating to, for example, communicating return link control information. In some implementations, the circuit/module for communicating 2222 receives information (e.g., from a component of the apparatus 2200), processes (e.g., encodes) the information, and sends the information to another component (e.g., the communication interface 2202) that will transmit the information. In some aspects, the information may be communicated via the at least one resource determined by the circuit/module for determining at least one resource for communicating 2220. For example, in some implementations, the circuit/module for communicating 2222 encodes information for transmission on a particular resource (e.g., prepares the information to be sent over designated time slots and/or tones). In some implementations, the circuit/module for communicating 2222 is a transceiver. In some implementations, the circuit/module for communicating 2222 is a transmitter. In some implementations, the communication interface 2202 includes the circuit/module for communicating 2222 and/or the code for communicating 2236.

The circuit/module for identifying a resource 2224 may include circuitry and/or programming (e.g., code for identifying a resource 2232 stored on the storage medium 2204) adapted to perform several functions relating to, for example, identifying a resource indicated by one of a plurality control channel candidates allocated for forward link control signaling. For example, in some implementations, the circuit/module for identifying a resource 2224 uses an index to identify a resource from a set of allocated resources. To this end, the circuit/module for identifying a resource 2224 may obtain the index (e.g., receive the index via the communication interface 2202 or retrieve the index from the memory device 2208), apply the index to a set of resources to identify a particular one (or set) of the resources, and output an indication of the identified resource(s).

The circuit/module for receiving 2226 may include circuitry and/or programming (e.g., code for receiving 2234 stored on the storage medium 2204) adapted to perform several functions relating to, for example, receiving information. In some implementations, the information includes at least one indication of the quantity of control channel indices allocated for forward link control signaling and the quantity of return link carriers. In some implementations, the information includes a control parameter. In some implementations, the information includes forward link control information that is received via the resource identified by the circuit/module for identifying a resource 2226. In some implementations, the circuit/module for receiving 2226 receives information (e.g., from the communication interface 2202 or some other component of the apparatus 2200), processes (e.g., decodes) the information, and sends the information to another component (e.g., the memory device 2208). In some implementations, the circuit/module for receiving 2226 decodes information received on a particular resource (e.g., processes the information received over designated time slots and/or tones). In some implementations, the circuit/module for receiving 2226 is a transceiver. In some implementations, the circuit/module for receiving 2226 is a receiver. In some implementations, the communication interface 2202 includes the circuit/module for receiving 2226 and/or the code for receiving 2234. In some implementations, the functionality of the circuit/module for receiving 2226 is incorporated into (or provided by) the circuit/module for communicating 2222.

As mentioned above, programming stored by the storage medium 2204, when executed by the processing circuit 2210, causes the processing circuit 2210 to perform one or more of the various functions and/or process operations described herein. For example, the programming, when executed by the processing circuit 2210, may cause the processing circuit 2210 to perform the various functions, steps, and/or processes described herein with respect to FIGS. 16 and 23-25 in various implementations. As shown in FIG. 22, the storage medium 2204 may include one or more of the code for determining at least one resource for communicating 2228, the code for communicating 2230, the code for receiving 2232, or the code for identifying a resource 2234.

Fifth Example Process

Figure 23:
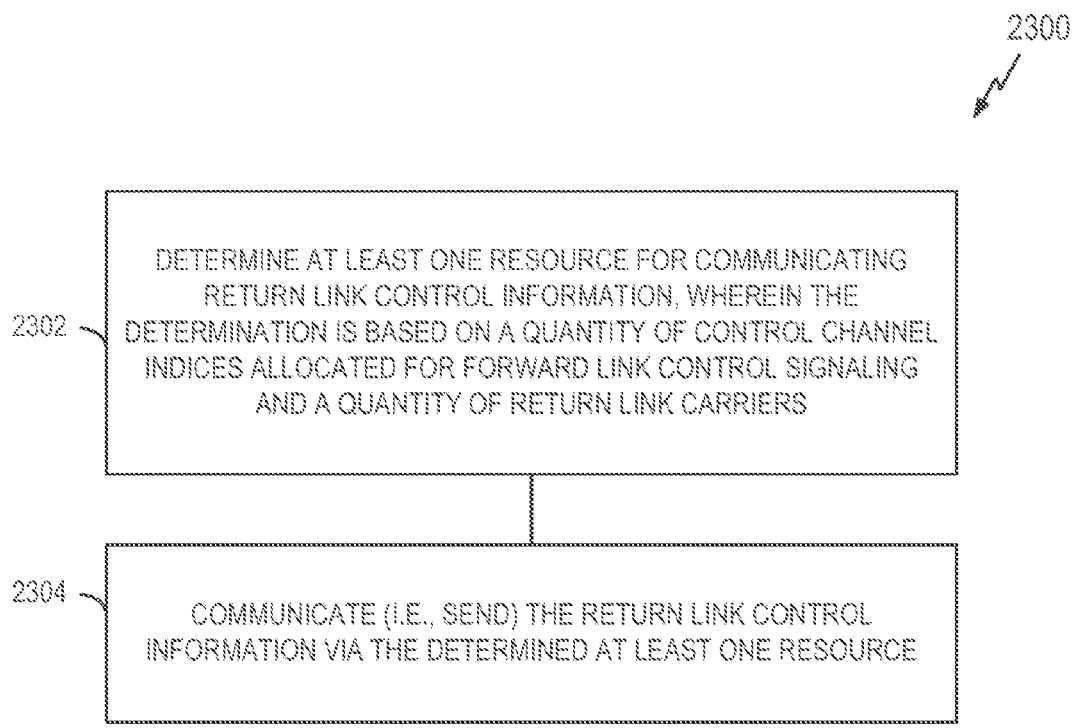
FIG. 23 is a flowchart illustrating an example of a communication process in accordance with some aspects of the disclosure.

FIG. 23 illustrates a process 2300 for communication in accordance with some aspects of the disclosure. The process 2300 may take place, at least in part, within a processing circuit (e.g., the processing circuit 2210 of FIG. 22), which may be located in a UT, a UE, or some other suitable apparatus. In some implementations, the process 2300 represents operations performed, at least in part, by at least one of: the controller 126 of FIG. 1 or the control processor 420 of FIG. 4. Of course, in various aspects within the scope of the disclosure, the process 2300 may be implemented by any suitable apparatus capable of supporting communication operations.

At block 2302, an apparatus (e.g., a UT or a UE) determines at least one resource for communicating return link control information, wherein the determination is based on a quantity of control channel indices allocated for forward link control signaling and a quantity of return link carriers.

In some implementations, the circuit/module for determining at least one resource for communicating 2220 of FIG. 22 performs the operations of block 2302. In some implementations, the code for determining at least one resource for communicating 2228 of FIG. 22 is executed to perform the operations of block 2302.

At block 2304, the apparatus communicates (i.e., sends) the return link control information via the at least one resource determined at block 2302.

In some implementations, the circuit/module for communicating 2222 of FIG. 22 performs the operations of block 2304. In some implementations, the code for communicating 2230 of FIG. 22 is executed to perform the operations of block 2304.

Sixth Example Process

Figure 24:
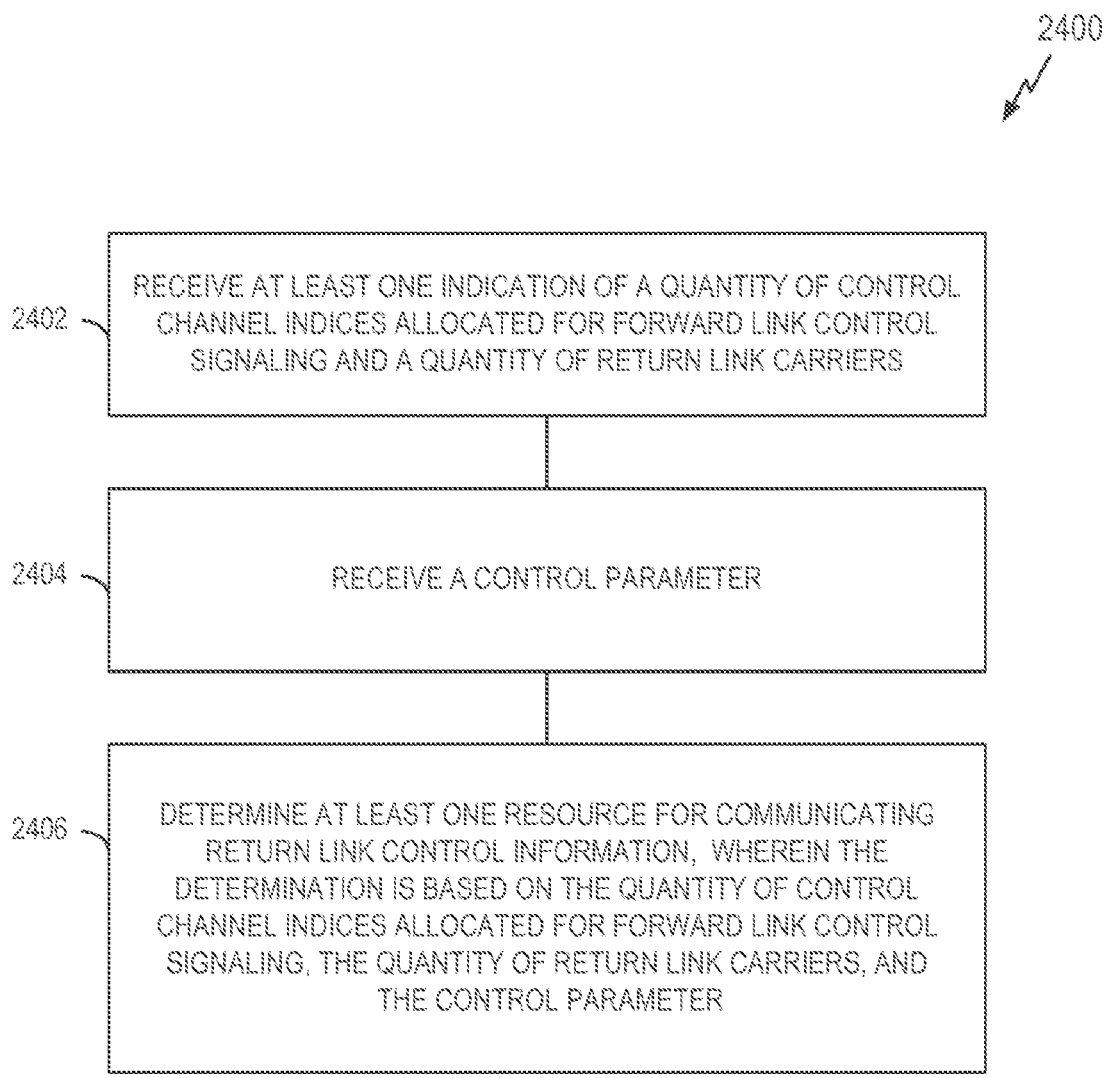
FIG. 24 is a flowchart illustrating an example of a process for determining a resource in accordance with some aspects of the disclosure.

FIG. 24 illustrates a process 2400 for communication in accordance with some aspects of the disclosure. In some implementations, the process 2400 may be performed in addition to (e.g., in conjunction with) the process 2300 of FIG. 23. The process 2400 may take place, at least in part, within a processing circuit (e.g., the processing circuit 2210 of FIG. 22), which may be located in a UT, a UE, or some other suitable apparatus. In some implementations, the process 2400 represents operations performed, at least in part, by at least one of: the controller 126 of FIG. 1 or the control processor 420 of FIG. 4. Of course, in various aspects within the scope of the disclosure, the process 2400 may be implemented by any suitable apparatus capable of supporting communication operations.

At block 2402, an apparatus (e.g., a UT or a UE) receives at least one indication of the quantity of control channel indices allocated for forward link control signaling and the quantity of return link carriers.

In some implementations, the circuit/module for receiving 2226 of FIG. 22 performs the operations of block 2402. In some implementations, the code for receiving 2234 of FIG. 22 is executed to perform the operations of block 2402.

At block 2404, the apparatus receives a control parameter. In some aspects, the control parameter may be defined to balance return link control resource overhead and a likelihood of collision associated with resource allocations for return link control signaling (e.g., in a multiple return link carrier scenario).

In some implementations, the circuit/module for receiving 2226 of FIG. 22 performs the operations of block 2404. In some implementations, the code for receiving 2234 of FIG. 22 is executed to perform the operations of block 2404.

At block 2406, the apparatus determines at least one resource for communicating return link control information. In some aspects, the determination may be based on the quantity of control channel indices allocated for forward link control signaling and the quantity of return link carriers of block 2402. In some aspects, the determination may be based on the control parameter of block 2404.

In some implementations, the circuit/module for determining at least one resource for communicating 2220 of FIG. 22 performs the operations of block 2406. In some implementations, the code for determining at least one resource for communicating 2228 of FIG. 22 is executed to perform the operations of block 2406.

Seventh Example Process

Figure 25:
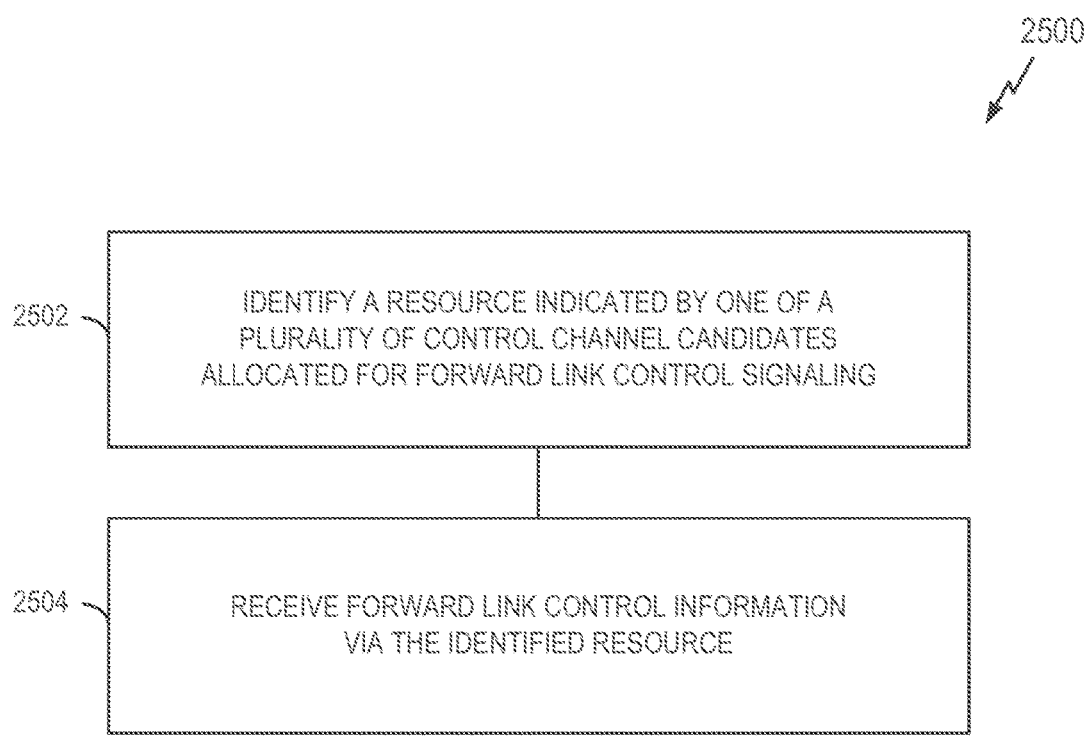
FIG. 25 is a flowchart illustrating an example of a communication process in accordance with some aspects of the disclosure.

FIG. 25 illustrates a process 2500 for communication in accordance with some aspects of the disclosure. In some implementations, the process 2500 may be performed in addition to (e.g., in conjunction with) the process 2300 of FIG. 23. The process 2500 may take place, at least in part, within a processing circuit (e.g., the processing circuit 2210 of FIG. 22), which may be located in a UT, a UE, or some other suitable apparatus. In some implementations, the process 2500 represents operations performed, at least in part, by at least one of: the controller 126 of FIG. 1 or the control processor 420 of FIG. 4. Of course, in various aspects within the scope of the disclosure, the process 2500 may be implemented by any suitable apparatus capable of supporting communication operations.

At block 2502, an apparatus (e.g., a UT or a UE) identifies a resource indicated by one of a plurality control channel candidates allocated for forward link control signaling.

In some implementations, the circuit/module for identifying a resource 2224 of FIG. 22 performs the operations of block 2502. In some implementations, the code for identifying a resource 2232 of FIG. 22 is executed to perform the operations of block 2502.

At block 2504, the apparatus receives forward link control information via the resource identified at block 2502.

In some implementations, the circuit/module for receiving 2226 of FIG. 22 performs the operations of block 2504. In some implementations, the code for receiving 2234 of FIG. 22 is executed to perform the operations of block 2504.

Additional Aspects

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. Although a flowchart may describe the operations as a sequential process, many of the operations can be performed in parallel or concurrently. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The terminology used herein is for the purpose of describing particular aspects only and is not intended to be limiting of the aspects. As used herein, the singular forms "a," "an"

and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements includes one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication by an apparatus, comprising:
   determining a quantity of control channel indices allocated for forward link control signaling for a data transmission on a forward link carrier;
   determining a quantity of return link carriers allocated for communicating return link information associated with the data transmission, wherein the determined quantity of return links carriers is at least two return link carriers;
   determining at least one resource for communicating return link control information via the return link carriers, wherein the determination comprises performing a modulo operation based on a ratio of the determined quantity of control channel indices allocated for forward link control signaling to the determined quantity of return link carriers; and
   communicating the return link control information on one of the return link carriers via the determined at least one resource.

2. The method of claim 1, wherein the forward link control channel indices comprise control channel element (CCE) indices.

3. The method of claim 1, wherein the return link control information comprises hybrid automatic repeat request (HARQ) feedback.

4. The method of claim 1, wherein a ratio of the quantity of control channel indices allocated for forward link control signaling to a quantity of resources allocated in each return link carrier for communicating the return link control information is N-to-1, where N is greater than 1.

5. The method of claim 1, wherein the determination of the at least one resource for communicating return link control information is further based on a control parameter that is defined to balance return link control resource overhead and a likelihood of collision associated with resource allocations for return link control signaling.

6. The method of claim 5, further comprising defining the control parameter based on a quantity of users in a coverage area.

7. The method of claim 5, further comprising defining the control parameter based on a size of a forward link control region.

8. The method of claim 5, wherein the determination of the at least one resource for communicating return link control information further comprises performing the modulo operation based on the control parameter.

9. The method of claim 1, wherein the determination of the at least one resource for communicating return link control information comprises performing the modulo operation on a control channel index associated with forward link data transmission.

10. The method of claim 1, wherein the communicating comprises receiving the return link control information.

11. The method of claim 10, wherein the determination of the at least one resource for communicating return link control information comprises scheduling more than one user terminal communicating return link control information within a single transmission time interval.

12. The method of claim 10, further comprising determining whether a collision associated with resource allocations for return link control signaling would occur based on whether a forward link grant allocation index for one user terminal is equal to an allocation index for another user terminal under a modulo operation.

13. The method of claim 10, further comprising avoiding a collision by scheduling user terminals on different return link carriers.

14. The method of claim 10, further comprising avoiding a collision by scheduling a return link grant instead of a forward link grant.

15. The method of claim 10, further comprising avoiding a collision by using a different control channel candidate associated with a different index of a first control channel element (CCE) for forward link control signaling.

16. The method of claim 10, further comprising:
determining a quantity of control channel candidates allocated for the forward link control signaling; and
sending forward link control information via a resource indicated by one of the control channel candidates allocated for the forward link control signaling.

17. The method of claim 1, wherein the communicating comprises sending the return link control information.

18. The method of claim 17, further comprising receiving at least one indication of the quantity of control channel indices allocated for forward link control signaling and the quantity of return link carriers.

19. The method of claim 17, wherein:
the determination is further based on a control parameter; and
the method further comprises receiving the control parameter.

20. The method of claim 17, further comprising:
identifying a resource indicated by one of a plurality of control channel candidates allocated for forward link control signaling; and
receiving forward link control information via the identified resource.

21. An apparatus for communication comprising:
a memory; and
a processor coupled to the memory,
the processor and the memory configured to:
determine a quantity of control channel indices allocated for forward link control signaling for a data transmission on a forward link carrier;
determine a quantity of return link carriers allocated for communicating return link information associated with the data transmission, wherein the determined quantity of return links carriers is at least two return link carriers;
determine at least one resource for communicating return link control information via the return link carriers, wherein the determination comprises performing a modulo operation based on a ratio of the determined quantity of control channel indices allocated for forward link control signaling to the determined quantity of return link carriers; and
communicate the return link control information on one of the return link carriers via the determined at least one resource.

22. The apparatus of claim 21, wherein the forward link control channel indices comprise control channel element (CCE) indices.

23. The apparatus of claim 21, wherein the return link control information comprises hybrid automatic repeat request (HARQ) feedback.

24. The apparatus of claim 21, wherein a ratio of the quantity of control channel indices allocated for forward link control signaling to a quantity of resources allocated for communicating the return link control information is N-to-1, where N is greater than 1.

25. The apparatus of claim 21, wherein the determination of the at least one resource for communicating return link control information is further based on a control parameter that is defined to balance return link control resource overhead and a likelihood of collision associated with resource allocations for return link control signaling.

26. An apparatus for communication comprising:
means for determining a quantity of control channel indices allocated for forward link control signaling for a data transmission on a forward link carrier;
means for determining a quantity of return link carriers allocated for communicating return link information associated with the data transmission, wherein the determined quantity of return links carriers is at least two return link carriers;
means for determining at least one resource for communicating return link control information via the return link carriers, wherein the determination comprises performing a modulo operation based on a ratio of the determined quantity of control channel indices allocated for forward link control signaling to the determined quantity of return link carriers; and
means for communicating the return link control information on one of the return link carriers via the determined at least one resource.

27. The apparatus of claim 26, wherein the determination of the at least one resource for communicating return link control information further comprises performing the modulo operation based on the control parameter.

28. The apparatus of claim 26, wherein the determination of the at least one resource comprises performing the modulo operation on a control channel index associated with forward link data transmission.

29. The apparatus of claim 26, wherein:
the forward link control channel indices comprise control channel element (CCE) indices; and
the return link control information comprises hybrid automatic repeat request (HARQ) feedback.

30. A non-transitory computer-readable medium storing computer-executable code for communication by an apparatus, including code to:
determine a quantity of control channel indices allocated for forward link control signaling for a data transmission on a forward link carrier;
determine a quantity of return link carriers allocated for communicating return link information associated with the data transmission, wherein the determined quantity of return links carriers is at least two return link carriers;
determine at least one resource for communicating return link control information via the return link carriers, wherein the determination comprises performing a modulo operation based on a ratio of the determined quantity of control channel indices allocated for forward link control signaling to the determined quantity of return link carriers; and
communicate the return link control information on one of the return link carriers via the determined at least one resource.

* * * * *